US011417103B2

(12) United States Patent
Mori et al.

(10) Patent No.: US 11,417,103 B2
(45) Date of Patent: Aug. 16, 2022

(54) INVESTIGATION ASSIST SYSTEM AND INVESTIGATION ASSIST METHOD

(71) Applicant: PANASONIC I-PRO SENSING SOLUTIONS CO., LTD., Fukuoka (JP)

(72) Inventors: Yuichiro Mori, Fukuoka (JP); Hideo Noguchi, Fukuoka (JP); Yoshitaka Fukushima, Fukuoka (JP); Hiroaki Ootake, Fukuoka (JP); Ryoji Koga, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 17/009,264

(22) Filed: Sep. 1, 2020

(65) Prior Publication Data

US 2021/0064885 A1    Mar. 4, 2021

(30) Foreign Application Priority Data

Sep. 3, 2019 (JP) .............................. JP2019-160659

(51) Int. Cl.
*G06V 20/52* (2022.01)
*G06Q 50/26* (2012.01)
(Continued)

(52) U.S. Cl.
CPC ............. *G06V 20/52* (2022.01); *G06Q 50/26* (2013.01); *G06V 20/62* (2022.01); *G06V 40/172* (2022.01)

(58) Field of Classification Search
None
See application file for complete search history.

(56) References Cited

U.S. PATENT DOCUMENTS

2004/0184528 A1    9/2004  Miyasaka et al.
2015/0356840 A1*  12/2015  Wang ............... G08B 13/19682
                                                    382/103
(Continued)

FOREIGN PATENT DOCUMENTS

GB      201818794     *  1/2019  ........... G06F 16/739
JP     2004-289294       10/2004
(Continued)

OTHER PUBLICATIONS

Office Action from Japan Patent Office (JPO) in Japanese Patent Appl. No. 2019-160659, dated Jun. 15, 2021, together with an English language translation.

*Primary Examiner* — Delomia L Gilliard
(74) *Attorney, Agent, or Firm* — Greenblum & Bernstein, P.L.C.

(57) ABSTRACT

An investigation assist system includes a plurality of servers and an integration server communicatively connected to a terminal and the plurality of servers. In response to reception of a video captured by a plurality of cameras, each of the plurality of servers performs a video analysis of an object with respect to an incident, the plurality of servers processing different objects, respectively. Based on an input of a plurality of different object feature elements from the terminal, the integration server sends a search request for corresponding objects to the respective servers corresponding to the object feature elements, receives and integrates search results of the corresponding objects from the respective servers, and causes the terminal to display an integrated search result.

20 Claims, 17 Drawing Sheets

(51) Int. Cl.
*G06V 20/62* (2022.01)
*G06V 40/16* (2022.01)

(56) References Cited

U.S. PATENT DOCUMENTS

| | | | |
|---|---|---|---|
| 2018/0181836 A1* | 6/2018 | Xie | G06K 9/00771 |
| 2019/0080003 A1* | 3/2019 | Alcantara | G06F 16/784 |
| 2019/0122064 A1* | 4/2019 | Ishikawa | G06K 9/3241 |
| 2019/0163966 A1* | 5/2019 | Moriya | G08B 21/22 |
| 2020/0097734 A1* | 3/2020 | Miyake | H04N 21/4316 |

FOREIGN PATENT DOCUMENTS

| | | |
|---|---|---|
| JP | 2007-174016 | 7/2007 |
| JP | 2015-002401 | 1/2015 |
| JP | 2018-005555 | 1/2018 |
| JP | 2018-142137 | 9/2018 |
| WO | 2017/017808 | 2/2017 |

* cited by examiner

INVESTIGATION ASSIST SYSTEM AND INVESTIGATION ASSIST METHOD

BACKGROUND OF THE INVENTION

1. Field of the Invention

The present disclosure relates to an investigation assist system, an investigation assist method, and a computer program that assist an investigation such as an incident by an investigation agency.

2. Background Art

A technique is known in which a plurality of camera devices are arranged at predetermined positions on the travel route of a vehicle, and the camera image information captured by each camera device is displayed on a display device in a terminal device mounted on the vehicle through a network and a wireless information exchange device (for example, see JP-A-2007-174016). According to JP-A-2007-174016, a user can obtain a real-time camera image having a large amount of information, based on the camera image information captured by the plurality of cameras arranged on the traveling route of the vehicle.

SUMMARY OF THE INVENTION

In JP-A-2007-174016, since the camera image information captured by each of the plurality of camera devices can be displayed on the display device in the terminal device mounted on the vehicle, the user (for example, a driver) can confirm real-time camera image information at the location where each camera device is arranged. However, in JP-A-2007-174016, in view of the recent fact that forms of incidents or accidents (hereinafter, referred to as "incidents") are diversifying, it is not considered to efficiently narrow down a suspect who has caused an incident or the getaway vehicle used by the suspect for escape. A person who witnesses an incident (that is, an eyewitness) rarely remembers the details of the appearance of the suspected person or the getaway vehicle in detail, and often remembers some of the characteristics of the part. However, if even one or more such partial features can be collected and searched, there is a possibility that the efficiency of early narrowing down of the suspect or the getaway vehicle can be improved. In particular, in an investigation by an investigation agency such as the police (especially, the initial investigation), it is often required to specify the suspect or the getaway vehicle as soon as possible. However, even if the technique of JP-A-2007-174016 is used, if an investigator (for example, a police officer) manually checks and confirms the images of individual camera devices, it takes time to specify the suspect or the getaway vehicle, which is inefficient, and therefore, there is a problem that it is difficult to detect a suspect or a getaway vehicle at an early stage.

The present disclosure has been devised in view of the above-mentioned conventional circumstances and aims to provide an investigation assist system, an investigation assist method, and a computer program that improve the convenience of an investigation by an investigation agency such as the police by promptly and efficiently assisting the specification of a suspect who has caused an incident or a getaway vehicle used by the suspect for escape.

The present disclosure provides an investigation assist system that includes a plurality of servers and an integration server communicatively connected to a terminal and the plurality of servers, in which in response to reception of a video captured by a plurality of cameras, each of the plurality of servers performs a video analysis of an object with respect to an incident, the plurality of servers processing different objects, respectively, and based on an input of a plurality of different object feature elements from the terminal, the integration server sends a search request for corresponding objects to the respective servers corresponding to the object feature elements, receives and integrates search results of the corresponding objects from the respective servers, and causes the terminal to display an integrated search result.

Further, the present disclosure provides an investigation assist method performed by an investigation assist system including a plurality of servers and an integration server communicatively connected to a terminal and the plurality of servers, the investigating assist method including receiving a video captured by a plurality of cameras, causing a plurality of servers to perform a video analysis of an object with respect to an incident, the plurality of servers processing different objects, respectively, based on an input of a plurality of different object feature elements from the terminal, sending a search request for corresponding objects to the respective servers corresponding to the object feature elements, and receiving and integrating search results of the corresponding objects from the respective servers, and causing the terminal to display an integrated search result.

Further, the present disclosure provides a computer program for causing an integration server which is a computer device to realize communicating with a terminal and communicate with a plurality of servers that perform an video analysis of different objects with respect to an incident or like by using videos captured by a plurality of cameras, based on an input of a plurality of different object feature elements from the terminal, sending a search request for a corresponding object to the server corresponding to the object feature element, and receiving and integrating search results of the corresponding objects from the respective servers, and displaying the search results on the terminal.

According to the present disclosure, it is possible to quickly and efficiently assist the specification of a suspect who has caused an incident or the like, and the getaway vehicle used by the suspect for escape, and improve the convenience of an investigation by an investigation agency such as the police.

DETAILED DESCRIPTION OF THE EXEMPLARY EMBODIMENT

Hereinafter, an embodiment specifically disclosing the configuration and operation of an investigation assist system, an investigation assist method, and a computer program according to the present disclosure will be described in detail with reference to the accompanying drawings. However, more detailed description than necessary may be omitted. For example, detailed description of well-known matters or duplicate description of substantially the same configuration may be omitted. This is to prevent the following description from being unnecessarily redundant and to facilitate understanding by those skilled in the art. The accompanying drawings and the following description are provided for those skilled in the art to fully understand the present disclosure, and are not intended to limit the claimed subject matter thereby.

Hereafter, by using the videos captured by cameras installed in various places in a city, an example will be described in which an investigation assist system assists the investigation of a police officer who narrows down and tracks a suspect who has caused an incident in the city or getaway vehicles used by the suspect for escape.

Embodiment 1

Figure 1:
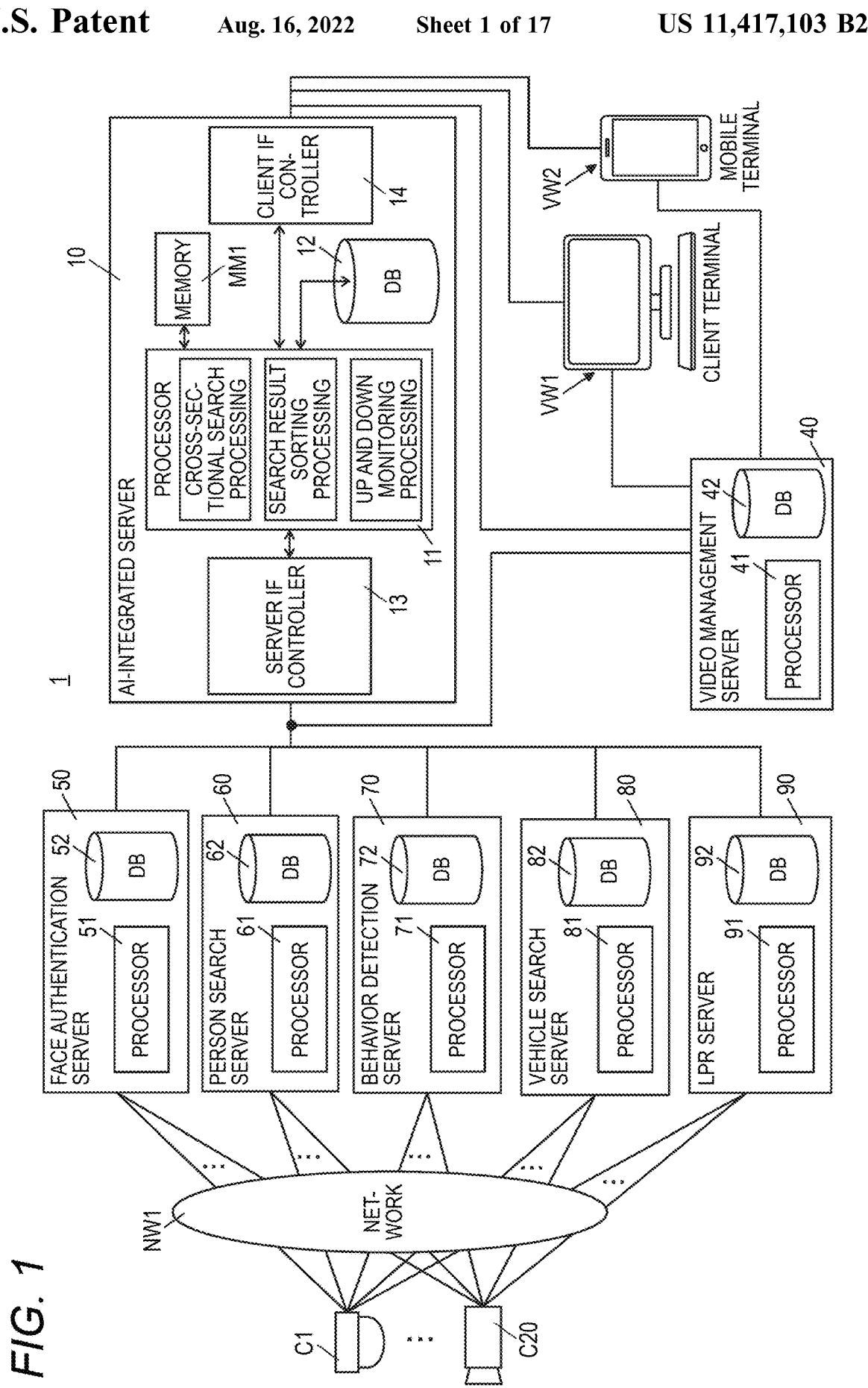
FIG. 1 is a block diagram showing a system configuration example of an investigation assist system according to Embodiment 1.

FIG. 1 is a block diagram showing a system configuration example of an investigation assist system 1 according to Embodiment 1. The investigation assist system 1 includes at least an artificial intelligent (AI) integration server 10, a video management server 40, a face authentication server 50, a person search server 60, an behavior detection server 70, a vehicle search server 80, and a license plate recognition (LPR) server 90. The investigation assist system 1 may further include a client terminal VW1 and a mobile terminal VW2 as viewer devices. Each of the video management server 40, the face authentication server 50, the person search server 60, the behavior detection server 70, the vehicle search server 80, and the LPR server 90 is connected to each of a plurality (for example, 20) of cameras C1 to C20 in a communicative manner via a network NW1. Each of the AI-integration server 10, the video management server 40, the face authentication server 50, the person search server 60, the behavior detection server 70, the vehicle search server 80, and the LPR server 90 may be a server of the investigation assist system 1 and may be an on-premise server in a police station or a cloud server connected to a network such as the Internet.

Although only one client terminal VW1 and one mobile terminal VW2 are shown in FIG. 1, a plurality of client terminals VW1 and mobile terminals VW2 may be provided. Further, the investigation assist system 1 is not limited to being used only within a single police station, and may be applied to an example in which a joint investigation is carried out across a plurality of police stations.

Each of the cameras C1 to C20 is installed at various places in the city for monitoring purposes, generates captured video data of a captured area (in other words, a subject), and sends the video data to the respective servers (specifically, the face authentication server 50, the person search server 60, the behavior detection server 70, the vehicle search server 80, and the LPR server 90) via the network NW1. In the following description, the captured video data includes not only the captured video data itself but also the identification information of the camera that has captured the captured video and the information of the captured date and time. Further, the identification information of the camera may include the identification information of the camera itself and the installation location information of the camera. Each of the cameras C1 to C20 may be fixedly installed on the road side of a main trunk road such as a national road or a prefectural road, or may be fixedly installed near an intersection. Each of the cameras C1 to C20 is connected to each server (specifically, the face authentication server 50, the person search server 60, the behavior detection server 70, the vehicle search server 80, and the LPR server 90) in a communicative manner via the network NW1 such as an intranet communication line. The network NW1 is configured by a wired communication line (for example, an optical communication network using an optical fiber), but may be configured by a wireless communication network. The cameras C1 to C20 may all be manufactured by the same manufacturer, or some of the cameras may be manufactured by other companies. Further, in the configuration example of FIG. 1, the captured video data of each of the cameras C1 to C20 is commonly received by the respective servers (specifically, the face authentication server 50, the person search server 60, the behavior detection server 70, the vehicle search server 80, and the LPR server 90), but the common captured video data received by each server may be all the captured video data of the cameras C1 to C20 or only the captured video data of some cameras.

The video management server 40 as a server is installed in, for example, a police station, and includes at least a processor 41 and a database 42. Hereinafter, the database may be abbreviated as "DB". The video management server 40 stores data of processing results of the face authentication server 50, the person search server 60, the behavior detection server 70, the vehicle search server 80, and the LPR server 90, and stores the captured video data of each of the cameras C1 to C20. Although not shown in FIG. 1, the video management server 40 may receive and store the captured video data of each of the cameras C1 to C20 via the network NW1, or may receive and store the captured video data of each of the cameras C1 to C20 from any one of the face authentication server 50, the person search server 60, the behavior detection server 70, the vehicle search server 80, and the LPR server 90. In addition, in response to a request sent from the client terminal VW1 according to the operation of an operator in the police station or the mobile terminal VW2 according to the operation of a police officer in the field, the video management server 40 may read the captured video data satisfying the request from the database 42 and send the captured video to the client terminal VW1 or the mobile terminal VW2.

The face authentication server 50 as a server is installed in, for example, a police station, and includes at least a processor 51 and a database 52. Every time the processor 51 of the face authentication server 50 receives the captured video data of each of the cameras C1 to C20, the processor 51 performs a video analysis such as detecting the face of a person shown in the captured video data, and stores the video analysis result in the database 52. When the processor 51 of the face authentication server 50 detects a face image registered in blacklist data (see later) during the video analysis, the processor 51 may generate an alarm notification for notifying the detection of a person whose face image is registered in the blacklist data as a video analysis result. The face image for which the alarm notification is to be generated is registered in advance in the face authentication server 50, and this registration may be performed by an instruction of registration from the client terminal VW1 or the mobile terminal VW2 by an operation of the operator or the like. This alarm notification is sent from the face authentication server 50 to the AI-integration server 10 each time the alarm notification is generated. The video analysis result includes, for example, a face image of a person shown in the captured video data, the captured date and time of the captured video data used for the video analysis, and the identification information of the camera. Further, when the processor 51 of the face authentication server 50 receives a processing instruction (for example, an instruction to verify a face image) from the AI-integration server 10, the processor 51 verifies whether or not the face image to be verified included in the processing instruction is registered in the blacklist data (see later) of the database 52, and stores a verification result in the database 52. Here, the blacklist data (an example of a face database) is data in which personal information including a face image of a person with a criminal record, who has caused a past incident is registered for each incident, and is registered in the database 52. The blacklist data may be registered in the database 52 or may be registered in another external database (not shown).

The person search server 60 as a server is installed in, for example, a police station, and includes at least a processor 61 and a database 62. Every time the processor 61 of the person search server 60 receives the captured video data of each of the cameras C1 to C20, the processor 61 performs a video analysis for extracting information about a person (for example, a suspect) shown in the captured video data, and stores the video analysis result in the database 62. When the processor 61 of the person search server 60 detects a person who satisfies the person attribute information (for example, information indicating the external characteristics of a suspicious person) during the video analysis, the processor 61 may generate an alarm notification for notifying the detection of a person who satisfies the person attribute information as a video analysis result. The person attribute information for which the alarm notification is to be generated is registered in advance in the person search server 60, and this registration may be performed by an instruction of registration from the client terminal VW1 or the mobile terminal VW2 by an operation of the operator or the like. This alarm notification is sent from the person search server 60 to the AI-integration server 10 each time the alarm notification is generated. The video analysis result includes, for example, the person information shown in the captured video data (for example, a face, gender, age, hairstyle, height, body, personal belongings, accessories of the person shown in the captured video), the captured date and time of the captured video data used for the video analysis, and the identification information of the camera. The processor 61 of the person search server 60 stores this person information in association with the captured video data in the database 62. This video analysis result is referred to at the time of searching for the presence or absence of relevant person information, which is performed based on a processing instruction (for example, instruction to search for personal information) sent from the AI-integration server 10 when, for example, an incident occurs.

The behavior detection server 70 as a server is installed in, for example, a police station, and includes at least a processor 71 and a database 72. Every time the processor 71 of the behavior detection server 70 receives the captured video data of each of the cameras C1 to C20, the processor 71 performs a video analysis for detecting the presence or absence of a predetermined action (see later) caused by at least one person shown in the captured video data, and stores the video analysis result in the database 72. The video analysis result includes, for example, the content (type) of a predetermined action, the captured date and time of the captured video data used for the video analysis, and the identification information of the camera. Here, the predetermined action is, for example, at least one of actions that may trigger an incident such as staggering, fight, possession of pistols, shoplifting, and the like, but is not limited to these actions. When the predetermined action is detected, the processor 71 of the behavior detection server 70 generates an alarm notification (see Embodiment 2) including the captured date and time and the identification information of the camera corresponding to the captured video data in which the predetermined action is detected, and sends the alarm notification to the AI-integration server 10.

The vehicle search server 80 as a server is installed in, for example, a police station, and includes at least a processor 81 and a database 82. Every time the processor 81 of the vehicle search server 80 receives the captured video data of each of the cameras C1 to C20, the processor 81 performs a video analysis for extracting information about a vehicle (for example, a getaway vehicle) shown in the captured video data, and stores the video analysis result in the database 82. When the processor 81 of the vehicle search server 80 detects a vehicle satisfying the vehicle attribute information (for example, information indicating the external characteristics such as a vehicle type or a vehicle color of the getaway vehicle) during the video analysis, the processor 81 may generate an alarm notification for notifying the detection of a vehicle satisfying the vehicle attribute information as a video analysis result. The vehicle attribute information for which the alarm notification is to be generated is registered in advance in the vehicle search server 80, and this registration may be performed by an instruction of registration from the client terminal VW1 or the mobile terminal VW2 by an operation of the operator or the like. This alarm notification is sent from the vehicle search server 80 to the AI-integration server 10 each time the alarm notification is generated. The video analysis result includes, for example, vehicle information (for example, vehicle model, vehicle type, vehicle color, license plate information in the captured video) shown in the captured video data, the captured date and time of the captured video data used for the video analysis, and the identification information of the camera. The processor 81 of the vehicle search server 80 stores this vehicle information in association with the captured video data in the database 82. This video analysis result is referred to at the time of searching for the presence or absence of relevant vehicle information, which is performed based on a processing instruction (for example, instruction to search for vehicle information) sent from the AI-integration server 10 when, for example, an incident occurs.

The LPR server 90 as a server or a license authentication server is installed in, for example, a police station, and includes at least a processor 91 and a database 92. Every time the processor 91 of the LPR server 90 receives the captured video data of each of the cameras C1 to C20, the processor 91 performs a video analysis for extracting the license plate of the vehicle shown in the captured video data, and stores the video analysis result in the database 92. Upon detecting a license plate satisfying suspicious license plate data (for example, license plate information of a vehicle on which a suspicious person has ridden) during the video analysis, the processor 91 of the LPR server 90 may generate an alarm notification for notifying the detection of a license plate satisfying suspicious license plate data as a video analysis result. The suspicious license plate data for which the alarm notification is to be generated is registered in advance in the LPR server 90, and this registration may be performed by an instruction of registration from the client terminal VW1 or the mobile terminal VW2 by an operation of the operator or the like. This alarm notification is sent from the LPR server 90 to the AI-integration server 10 each time the alarm notification is generated. The processor 91 of the LPR server 90 verifies whether the license plate information to be verified included in the processing instruction (for example, instruction to verify the license plate) is registered in the license plate list data (see later) of the database 92 based on the processing instruction sent from the AI-integration server 10, and stores a verification result in the database 92. Here, the license plate list data is data in which the license plate information and the information (for example, face image and personal information) about the corresponding purchaser (in other words, the owner) of the vehicle are registered in advance in association with each other, and are registered in the database 92. The license plate list data may be registered in the database 92 or may be registered in another external database (not shown).

The client terminal VW1 is installed in, for example, a police station, is used by an operator (police officer) in the police station, and is configured by using, for example, a laptop or desktop personal computer (PC). For example, when an incident or the like occurs, the operator listens to various information (eyewitness information) with respect to an incident or the like by a telephone call from a person (eyewitness) who has notified the police station of the occurrence of the incident or the like, and operates the client terminal VW1 to input and record the data. The client terminal VW1 sends, for example, a processing request for searching for a person or a vehicle that matches or is similar to the eyewitness information to the AI-integration server 10, receives the search result acquired by the AI-integration server 10 through the search by each server (for example, the face authentication server 50, the person search server 60, the vehicle search server 80, and the LPR server 90) from the AI-integration server 10, and displays the search result (see later). In addition, when the client terminal VW1 is connected to the video management server 40 via a network in a police station such as a wireless LAN, the client terminal VW1 may access the video management server 40 to acquire desired captured video data, and reproduce and display the video data.

The mobile terminal VW2 is installed in, for example, a police station, is used by a police officer who is out in the field, and is configured by using a computer such as a smartphone or a tablet terminal. The mobile terminal VW2 sends, for example, a processing request for searching for a person or a vehicle matching or similar to the eyewitness information heard near the site to the AI-integration server 10, receives the search result acquired by the AI-integration server 10 through the search by each server (for example, face authentication server 50, person search server 60, vehicle search server 80, and LPR server 90) from the AI-integration server 10, and displays the search result (see later). Further, when the mobile terminal VW2 is connected to the video management server 40 via a network (not shown) such as a wireless LAN or a mobile phone network, the mobile terminal VW2 may access the video management server 40 to acquire desired captured video data, and reproduce and display the video data.

When the AI-integration server 10 as an integration server is installed in, for example, a police station, and the processing request for searching for a person or a vehicle is received from the client terminal VW1 or the mobile terminal VW2, a server required for searching for the processing request is specified. The AI-integration server 10 generates and sends a processing instruction corresponding to the specified server (for example, the face authentication server 50, the person search server 60, the vehicle search server 80, the LPR server 90). Here, in the investigation assist system 1 according to Embodiment 1, the manufacturers (makers) of the respective servers (specifically, the face authentication server 50, the person search server 60, the behavior detection server 70, the vehicle search server 80, and the LPR server 90) may be the same or different.

For example, when the makers of the respective servers (specifically, the face authentication server 50, the person search server 60, the vehicle search server 80, and the LPR server 90) are the same, it is conceivable that an application screen (for example, input screen of search condition or verification condition) for requesting a search from the client terminal VW1 or the mobile terminal VW2 to each server is generated in a common layout unique to the manufacturer. Therefore, the operator or the like can perform a cross-sectional search (AND search) in which a plurality of objects (for example, a person, a vehicle, a face, and a license plate) are mixed on the input screen of a single search condition.

However, when the makers of the respective servers (specifically, the face authentication server 50, the person search server 60, the vehicle search server 80, and the LPR server 90) are not the same, an application screen (for example, input screen of search condition) for requesting a search from the client terminal VW1 or the mobile terminal VW2 to a server manufactured by a different maker is generated with a different search algorithm or layout for each maker. In other words, when viewed from the client terminal VW1 or the mobile terminal VW2, the input screen (application) of the verification condition to the face authentication server 50, the input screen (application) of the search condition to the person search server 60, and the input screen (application) of the search condition to the vehicle search server 80 are different from each other, and for example, it is not possible to perform a cross-sectional search in which a plurality of objects (for example, a person, a vehicle, a face, and a license plate) are mixed at one time, which reduces the convenience of the system.

Therefore, in Embodiment 1, even if the makers of the respective servers (specifically, the face authentication server 50, the person search server 60, the vehicle search server 80, the LPR server 90) are different, upon receiving the search processing request from the client terminal VW1 or the mobile terminal VW2, the AI-integration server 10 uses a common interface (IF) for communication (access) to each server that is the destination of the processing request. The interface mentioned here is, for example, a common search algorithm in which the search algorithm for the objects used in each server is generalized, and the AI-integration server 10 saves this common search algorithm in advance. The AI-integration server 10 uses a common search algorithm for each server and sends an instruction of search or verification processing instruction to the corresponding server. Further, the interface may be, for example, an interface having a common agreement or protocol regarding communication with respective servers (specifically, the face authentication server 50, the person search server 60, the vehicle search server 80, and the LPR server 90), or may be an individual interface suitable for communication with each server. The AI-integration server 10 may send and receive data or information (for example, receive an alarm notification) by using an interface suitable for communication with each server.

The AI-integration server 10 is configured with, for example, a high-performance server computer, and specifically includes a memory MM1, a processor 11, a database 12, a server IF controller 13, and a client IF controller 14.

The memory MM1 is configured by using, for example, a random access memory (RAM) and a read only memory (ROM), and temporarily stores a program necessary to execute the operation of the AI-integration server 10, and further, data or information generated during the operation. The RAM is, for example, a work memory used when the processor 11 operates. The ROM stores in advance a program for controlling the processor 11, for example. The memory MM1 records road map information indicating the positions where the cameras C1 to C20 are installed, and records the information of the updated road map every time the information of the road map is updated due to, for example, new construction or maintenance work of the road.

The processor 11 is configured by using, for example, a central processing unit (CPU), a digital signal processor (DSP) or a field programmable gate array (FPGA), functions as a control unit of the AI-integration server 10, and performs control processing of generally controlling the operation of each part of the AI-integration server 10, data input/output processing with respect to each part of the AI-integration server 10, data calculation processing, and data storage processing. The processor 11 operates in accordance with a computer program according to the present disclosure stored in the memory MM1. This computer program causes, for example, the AI-integration server 10 which is a computer device to realize a step of communicating with a terminal (for example, the client terminal VW1 or the mobile terminal VW2), a step of communicating with a plurality of servers (for example, the face authentication server 50, the person search server 60, the behavior detection server 70, the vehicle search server 80, and the LPR server 90) that perform a video analysis of different objects with respect to an incident or the like by using the captured video data of each of the plurality of cameras C1 to C20, a step of sending a search request for a corresponding object to a server corresponding to an object feature element based on an input of a plurality of different object feature elements from the terminal, and a step of receiving search results of the corresponding objects from the respective servers to integrate and display the search results on the terminal.

For example, upon receiving a processing request for searching for a person or a vehicle from the client terminal VW1 or the mobile terminal VW2, the processor 11 specifies at least one server required for searching for the processing request. The processor 11 generates and sends a processing instruction (for example, a search instruction) corresponding to the specified server (for example, the face authentication server 50, the person search server 60, the vehicle search server 80, and the LPR server 90). Thereby, the processor 11 can perform a cross-sectional search for a person and a vehicle by using each of a plurality of servers (for example, the person search server 60 and the vehicle search server 80) (cross-sectional search processing). For example, the processor 11 performs, as the cross-sectional search processing, a narrowed-down search using the two objects of the feature and the face of the person, or the three objects of the vehicle, the person, and the face on the corresponding server.

For example, when the processor 11 receives the search result from each server, the processor 11 sorts the search results for each object (for example, a person or a vehicle) (search result sorting processing). For example, the processor 11 determines a rank indicating the matching degree of the images (for example, person thumbnails, face thumbnails, and vehicle thumbnails) included in the search result based on the score (for example, a probability value indicating the likelihood of the search result obtained based on the processing of an AI engine) included in the search result from each server, and rearranges the images according to the rank.

For example, the processor 11 sends a predetermined command to each of the servers (specifically, the video management server 40, the face authentication server 50, the person search server 60, the behavior detection server 70, the vehicle search server 80, and the LPR server 90) which are connected to the AI-integration server 10. The processor 11 monitors whether the server is up or down (that is, whether or not a process in the server computer is operating) depending on whether or not a command response is received from each server (up and down monitoring processing).

The database 12 is configured by using, for example, a hard disk drive (HDD) or a solid state drive (SSD), and stores data or information acquired or generated by the processor 11.

The server IF controller 13 is configured with a communication interface circuit that controls communication (transmission/reception) between the AI-integration server 10 and the respective servers (specifically, the face authentication server 50, the person search server 60, the behavior detection server 70, the vehicle search server 80, and the LPR server 90). Further, the server IF controller 13 selects and uses an interface suitable for communication (access) to each server even if the makers of the face authentication server 50, the person search server 60, and the vehicle search server 80 are different. For example, the server IF controller 13 has an input/output interface for the face authentication server 50, an input/output interface for the person search server 60, and an input/output interface for the vehicle search server 80, respectively, and selects and uses an interface suitable for the search processing request from the client terminal VW1 or the mobile terminal VW2.

The client IF controller 14 is configured with a communication interface circuit that controls communication (transmission/reception) with each of the client terminal VW1, the mobile terminal VW2, and the video management server 40. The client IF controller 14 sends the search results sorted by the processor 11 to the client terminal VW1 or the mobile terminal VW2. The client IF controller 14 instructs the video management server 40 to distribute the captured video data to the client terminal VW1 or the mobile terminal VW2 or record the captured video data of each of the cameras C1 to C20. Further, the client IF controller 14 transfers the alarm notification from the behavior detection server 70 (see Embodiment 2) to each of the terminals (specifically, the client terminal VW1 and the mobile terminal VW2). The client IF controller 14 may transfer the alarm notification from the servers (for example, the face authentication server 50, the person search server 60, the vehicle search server 80, and the LPR server 90) other than the behavior detection server 70 to each of the terminals (specifically, the client terminal VW1 and the mobile terminal VW2).

Figure 2:
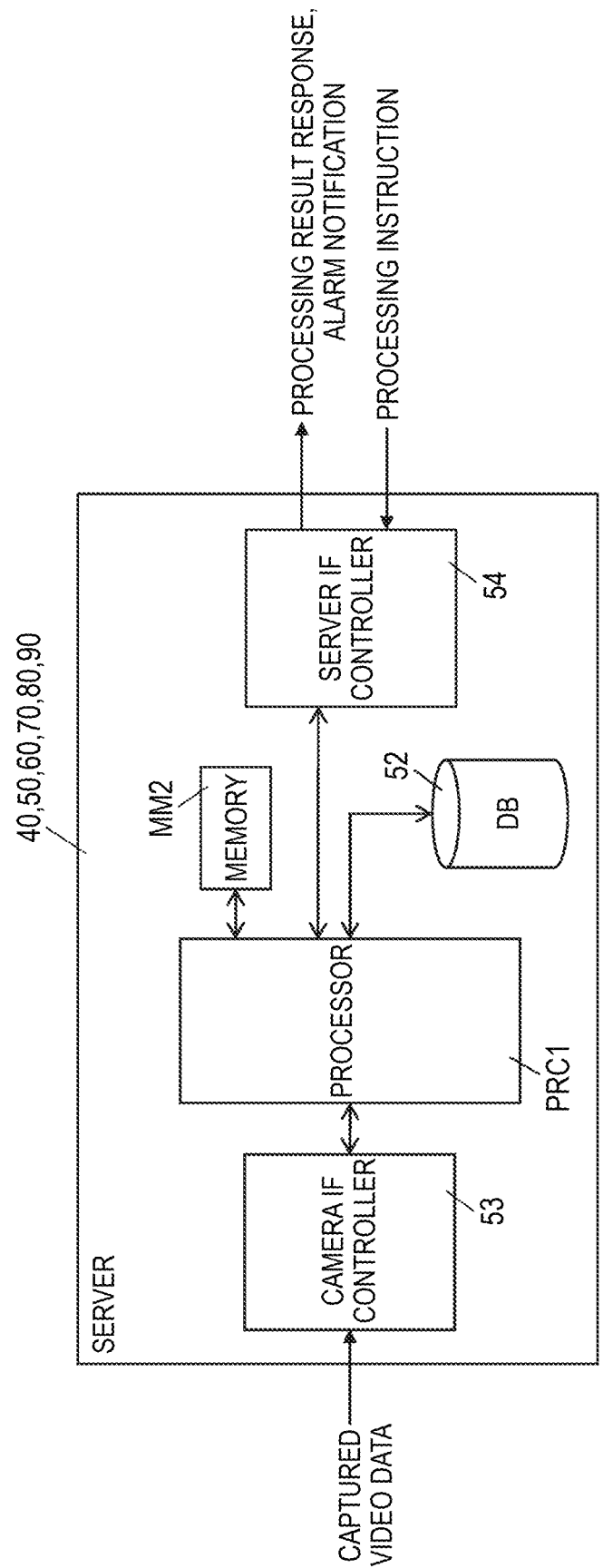
FIG. 2 is a block diagram showing a hardware configuration example of various servers that form the investigation assist system.

FIG. 2 is a block diagram showing an example of a hardware configuration of various servers that constitute the investigation assist system 1. Specifically, the various servers are the video management server 40, the face authentication server 50, the person search server 60, the behavior detection server 70, the vehicle search server 80, and the LPR server 90. Therefore, the server in the description of FIG. 2 is used as a term for collectively referring to the video management server 40, the face authentication server 50, the person search server 60, the behavior detection server 70, the vehicle search server 80, and the LPR server 90. In FIG. 2, the hardware configuration common to the respective servers will be described in detail, and the characteristic operation of each unit will be described in detail with reference to FIG. 1 or later, thus the description will be simplified here.

The server of FIG. 2 is configured with, for example, a server computer, and specifically includes a processor PRC1, a memory MM2, a database 52, a camera IF controller 53, and a server IF controller 54.

The processor PRC1 is configured by using, for example, a graphical processing unit (GPU) or an FPGA, functions as a control unit of the server, and performs control processing of generally controlling the operation of each part of the server, data input/output processing with respect to each part of the server, data calculation processing, and data storage processing. The processor PRC1 operates in accordance with a program stored in the memory MM2. The processor PRC1 of respective servers (specifically, the face authentication server 50, the person search server 60, the behavior detection server 70, the vehicle search server 80, and the LPR server 90) can execute a learned model generated by machine learning so as to be suitable for processing by the corresponding server, for example. Each server outputs a processing result and a score (see later) indicating the likelihood (confidence probability) of the processing result by executing the processing using the learned model.

For example, the face authentication server 50 uses the learned model for the face authentication server 50 to detect the face of a person shown in the captured video data of each of the cameras C1 to C20, and to execute the verification processing between the face image included in the verification instruction from the AI-integration server 10 and the blacklist data in the database 52. The face authentication server 50 outputs, as a processing result, the face image registered in the blacklist data and a score indicating the likelihood of the face image.

For example, the person search server 60 uses the learned model for the person search server 60 to detect and extract person information related to an object (person) shown in the captured video data of each of the cameras C1 to C20, and to execute the search processing of a person who satisfies the person search condition included in the verification instruction from the AI-integration server 10 by referring to the database 62. The person search server 60 outputs, as a processing result, the thumbnail (image) of a person who satisfies the person search condition, person information, and a score indicating the likelihood of the thumbnail.

For example, the behavior detection server 70 uses the learned model for the behavior detection server 70 to detect the presence or absence of a predetermined action caused by an object (person) shown in the captured video data of each of the cameras C1 to C20. The behavior detection server 70 outputs, as a processing result, the content (result) of the predetermined action determined to have the highest likelihood, the captured date and time of the captured video data in which the action is detected, and the identification information of the camera.

For example, the vehicle search server 80 uses the learned model for the vehicle search server 80 to detect and extract vehicle information related to an object (vehicle) shown in the captured video data of each of the cameras C1 to C20, and to execute search processing of a vehicle satisfying the vehicle search condition included in the verification instruction from the AI-integration server 10 by referring to the database 82. The vehicle search server 80 outputs, as a processing result, the thumbnail (image) of a vehicle satisfying the vehicle search condition, vehicle information, and a score indicating the likelihood of the thumbnail.

For example, the LPR server 90 uses the learned model for the LPR server 90 to detect and extract license plate information related to an object (license plate) shown in the captured video data of each of the cameras C1 to C20, and to execute the verification processing between the license plate information included in the verification instruction from the AI-integration server 10 and the license plate list data in the database 92. The LPR server 90 outputs, as a processing result, the face image and personal information of the purchaser (owner) of the vehicle corresponding to the license plate registered in the license plate list data.

The memory MM2 is configured by using, for example, a RAM and a ROM, and temporarily stores a program necessary to execute the operation of the server, and further data or information generated during the operation. The RAM is a work memory used when the processor PRC1 operates, for example. The ROM stores in advance a program for controlling the processor PRC1, for example.

The database 52 is configured by using, for example, an HDD or SSD, and stores data or information acquired or generated by the processor PRC1 of the server. The data generated by the processor PRC1 is, for example, the person information (see above) obtained as a result of the face image verification processing when the server is the face authentication server 50 or the result of the search processing when the server is the person search server 60, is the vehicle information (see above) obtained as a result of the search processing when the server is the vehicle search server 80, and is the license plate information obtained as a result of the search processing when the server is the LPR server 90.

The camera IF controller 53 is configured with a communication interface circuit that controls communication (transmission/reception) between the server and each of the cameras C1 to C20. The camera IF controller 53 receives the captured video data captured by each of the cameras C1 to C20 and outputs the captured video data to the processor PRC1.

The server IF controller 54 is configured with a communication interface circuit that controls communication (transmission/reception) between the server and the AI-integration server 10. The server IF controller 54 receives a processing instruction from the AI-integration server 10 and returns the processing result of the processor PRC1 based on the processing instruction to the AI-integration server 10. The server IF controller 54 also sends an alarm notification (see above) corresponding to the object detected by the processor PRC1 of each server to the AI-integration server 10.

Figure 3:
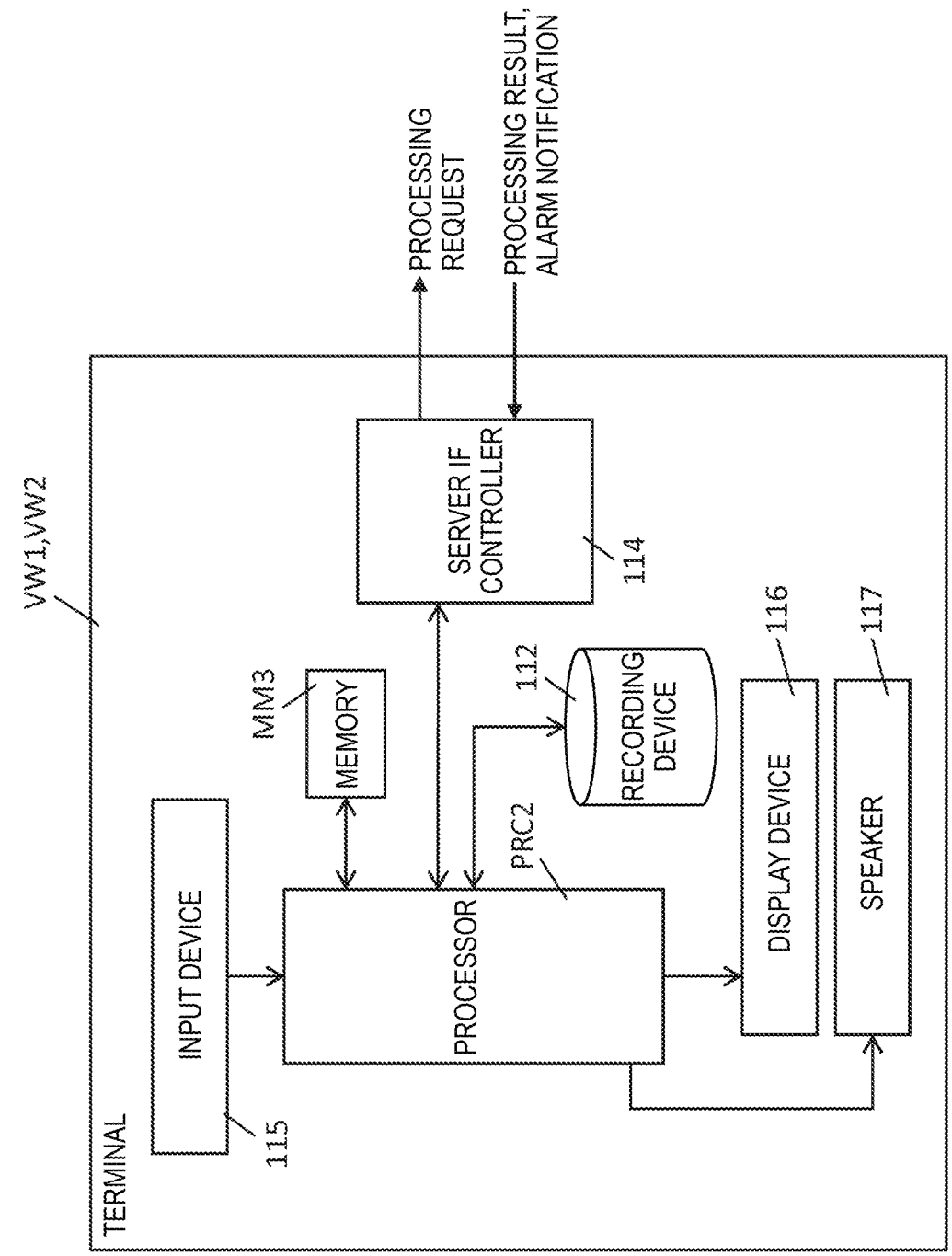
FIG. 3 is a block diagram showing a hardware configuration example of various terminals that constitute the investigation assist system.

FIG. 3 is a block diagram showing a hardware configuration example of various terminals that constitute the investigation assist system 1. Specifically, the various terminals are the client terminal VW1 and the mobile terminal VW2. Therefore, the terminal in the description of FIG. 3 is used as a term for collectively referring to the client terminal VW1 and the mobile terminal VW2. In FIG. 3, the hardware configuration common to the respective terminals will be described in detail, and the characteristic operation of each unit will be described in detail with reference to FIG. 1 or later, thus the description will be simplified here.

The terminal of FIG. 3 is configured with, for example, a computer, and specifically includes a processor PRC2, a memory MM3, a recording device 112, a server IF controller 114, an input device 115, a display device 116, and a speaker 117.

The processor PRC2 is configured by using, for example, a central processing unit (CPU), a digital signal processor (DSP), or an FPGA, functions as a control unit of the terminal, and performs control processing of generally controlling the operation of each part of the terminal, data input/output processing with respect to each part of the terminal, data calculation processing, and data storage processing. The processor PRC2 operates in accordance with a program stored in the memory MM3.

The memory MM3 is configured by using, for example, a RAM and a ROM, and temporarily stores a program necessary to execute the operation of the terminal, and further data or information generated during the operation. The RAM is a work memory used when the processor PRC2 operates, for example. The ROM stores in advance a program for controlling the processor PRC2, for example. The memory MM3 records road map information indicating the positions where the cameras C1 to C20 are installed, and records the information of the updated road map every time the information of the road map is updated due to, for example, new construction or maintenance work of the road.

The recording device 112 is configured by using, for example, an HDD or SSD, and stores data or information acquired or generated by the processor PRC2 of the terminal. The recording device 112 stores data of various search results sent from the AI-integration server 10.

The server IF controller 114 is configured with a communication interface circuit that controls communication (transmission/reception) between the terminal and the AI-integration server 10. The server IF controller 114 sends a search processing request generated by the processor PRC2 to the AI-integration server 10. The server IF controller 114 also receives various search results (processing results) or alarm notifications (see above) sent from the AI-integration server 10.

The input device 115 accepts an operation of an operator in the police station (for example, the user of the client terminal VW1) or a police officer who is out in the field (for example, a user of the mobile terminal VW2). The input device 115 is configured with, for example, a mouse, a keyboard, and a touch panel.

The display device 116 is configured with, for example, a liquid crystal display (LCD) or an organic electroluminescence (EL), and displays various data sent from the processor PRC2.

The speaker 117 acoustically outputs a sound when the processor PRC2 reproduces data (for example, video data included in the search result from the AI-integration server 10).

Next, in the police investigation using the investigation assist system 1 according to Embodiment 1, examples of various screens displayed on the display device 116 of the client terminal VW1 will be described with reference to FIGS. 4 to 11. In the description of FIGS. 4 to 11, the same configurations as the configurations shown in the drawings are referred to by the same reference numerals to simplify or omit the description. The screen examples displayed in each of FIGS. 4 to 11 may be displayed on the mobile terminal VW2. In order to make the description of FIGS. 4 to 11 easy to understand, it is assumed that the screen examples shown in FIGS. 4 to 11 are displayed on the client terminal VW1, but the "client terminal VW1" may be read as "mobile terminal VW2", and the "operator" may be read as "police officer".

In the police investigation, the client terminal VW1 launches and executes a preliminarily installed investigation assist application (hereinafter, referred to as "investigation assist application") by the operation of the operator. The investigation assist application is stored in, for example, the ROM of the memory MM3 of the client terminal VW1 and is executed by the processor PRC2 when activated by the operation of the operator. In other words, the investigation assist application as an operating subject in the following description can be read as the processor PRC2. The data or information generated by the processor PRC2 while the investigation assist application is running is temporarily stored in the RAM of the memory MM3.

Figure 4:
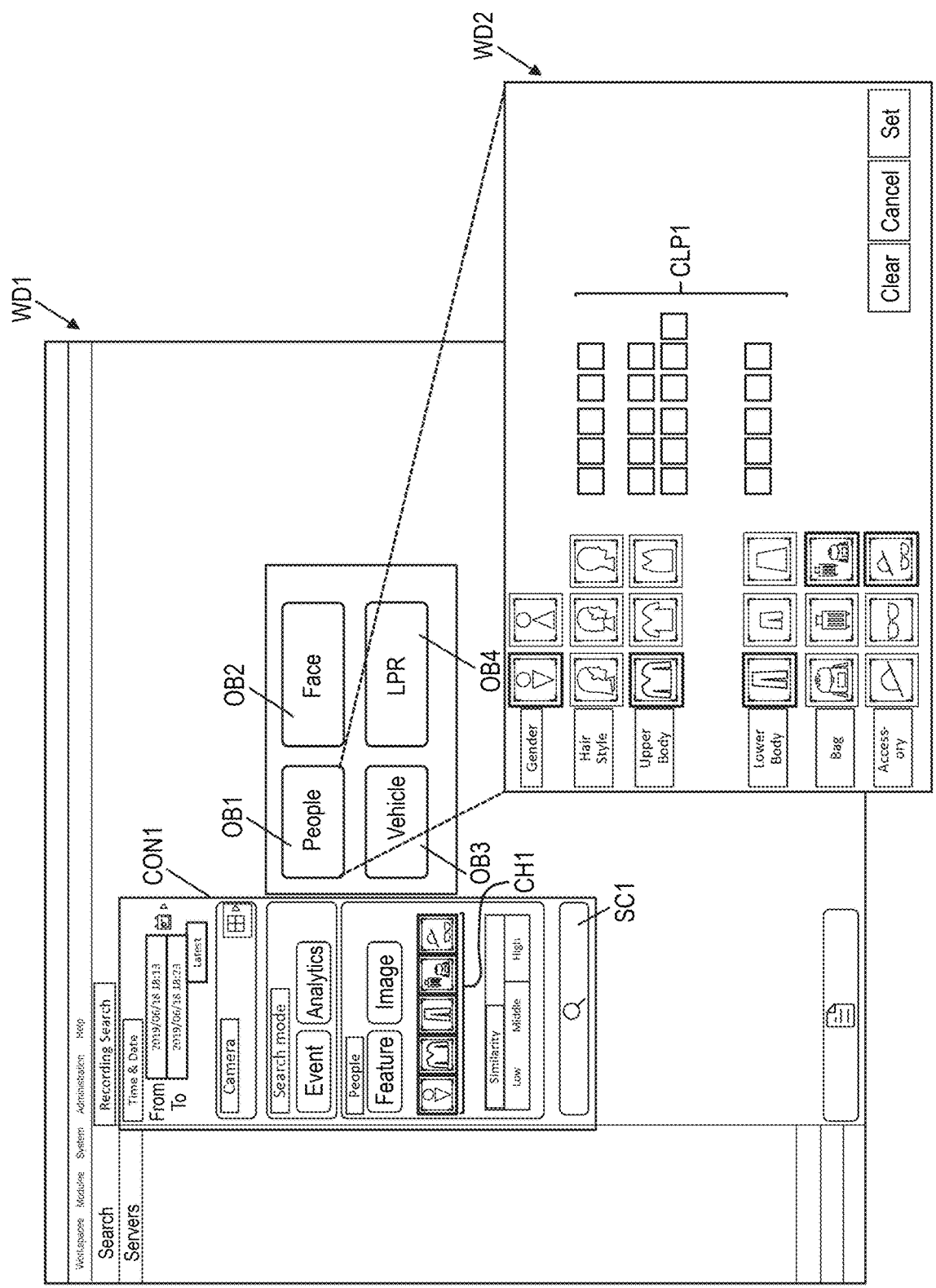
FIG. 4 is a diagram showing an example of a search screen displayed on a client terminal.
Figure 5:
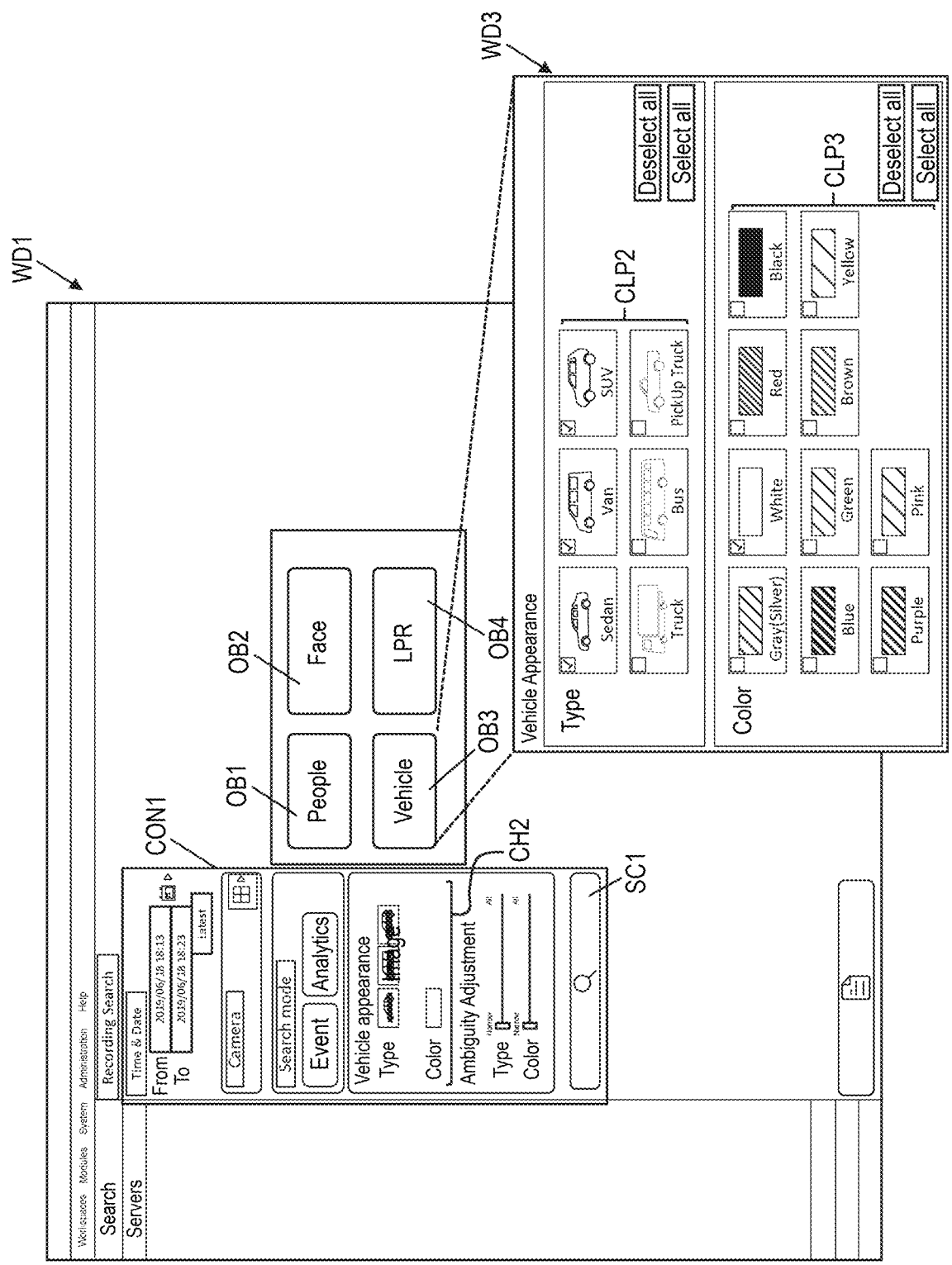
FIG. 5 is a diagram showing an example of a search screen displayed on the client terminal.

FIGS. 4 and 5 are diagrams showing an example of the search screen displayed on the client terminal VW1. The investigation assist application displays a search screen WD1 shown in FIG. 4 or FIG. 5 on the display device 116 by the operation of the operator when the operator starts a search for the person or the vehicle shown in the captured video data of the camera.

The search screen WD1 shown in FIG. 4 has an input field CON1 for various search conditions regarding an object (for example, a person) shown in the captured video data. When the person information is searched, the captured video data of one or more cameras selected or designated by the operation of the operator is a search target.

The input field CON1 for search conditions is provided with respective display areas so that Time & Date, Camera, Search mode, and a search icon SC1 can be input or selected.

In the display area of the date and time (Time & Date), a date and time start input field (From), a date and time end input field (To), and a Latest icon are arranged.

The date and time start input field (From) is input by the operator as the start date and time when the captured video data to be searched for an object (for example, a person such as a suspect or a vehicle such as a getaway vehicle) was captured. In the date and time start input field, for example, the date and time of occurrence of an incident or the date and time slightly before the date and time are input. In FIGS. 4 and 5, for example, "6:13 pm, Jun. 18, 2019" is input in the date and time start input field. When input by the operation of the operator, the investigation assist application sets the date and time input in the date and time start input field as a search condition (for example, start date and time).

The date and time end input field (To) is input by the operator as the end date and time when the captured video data to be searched for the object (for example, a person such as a suspect or a vehicle such as a getaway vehicle) was captured. In the date and time end input field, for example, a predetermined period (for example, a date and time slightly after the date and time of occurrence of the incident or the like) is input from the date and time input in the date and time start input field. In FIGS. 4 and 5, for example, "6:23 pm, Jun. 18, 2019" is input in the date and time end input field. When input by the operation of the operator, the investigation assist application sets the date and time input in the date and time end input field as a search condition (for example, end date and time).

The Latest icon is an icon for setting the search date and time to the latest date and time, and when pressed by the operation of the operator during the investigation, the investigation assist application sets the latest date and time (for example, a period 10 minutes before the date and time when the button is pressed) as a search condition (for example, period).

In the display area of the camera (Camera), a selection screen (not shown) for the camera to be searched is displayed. When a camera is selected by the operation of the operator, the investigation assist application sets the selected camera as a search target of captured video data.

In the display area of the search mode (Search mode), a selection icon of the search mode intended by the operator is arranged. For example, an Event icon and an Analytics icon are arranged. In FIGS. 4 and 5, the Analytics icon is selected by the operation of the operator.

The Event icon is selected, for example, when searching for data related to an event (case) such as a past incident.

The Analytics icon is selected, for example, when searching for an object shown in captured video data of a camera. Upon detecting that the Analytics icon has been selected, the investigation assist application displays a sub-window in which a People icon OB1, a Face icon OB2, a Vehicle icon OB3, and an LPR icon OB4 are arranged.

The People icon OB1 is selected by the operation of the operator when searching for a person such as a suspect as an object shown in the captured video data of the camera. The Face icon OB2 is selected by the operation of the operator when requesting the verification processing of the face of a person such as a suspect as an object shown in the captured video data of the camera to the face authentication server 50. The Vehicle icon OB3 is selected by the operation of the operator when searching for a vehicle such as a getaway vehicle as an object shown in the captured video data of the camera. The LPR icon OB4 is selected by the operation of the operator when requesting the verification processing of the license plate of a vehicle such as a vehicle that is a getaway vehicle as an object shown in the captured video data of the camera to the LPR server 90.

Upon detecting that the People icon OB1 has been pressed by the operation of the operator, the investigation assist application displays a person detail screen WD2 on the display device 116 (see FIG. 4). The person detail screen WD2 prompts the operator to select person characteristic elements (an example of an object feature element) for characterizing a person such as a suspect. The person characteristic elements are, specifically, Gender, Hair Style, clothes of Upper Body, clothes of Lower Body, Bag, Accessory), and the colors thereof. In FIG. 4, a different color palette CLP1 is provided for each of the hairstyle, clothes of upper body, and clothes of lower body. The investigation assist application sets at least one person characteristic element selected by the operation of the operator as a person search condition CH1. For example, in the person search condition CH1 in FIG. 4, the object feature elements "male", "wearing yellow long-sleeved clothes for upper body", "wearing black pants for lower body", "no bag", and "no accessories" are selected.

The search icon SC1 is pressed by the operation of the operator when a search using the set person search condition CH1 is started. Upon detecting that the search icon SC1 has been pressed, the investigation assist application generates a person search processing request including the person search condition CH1 and sends the request to the AI-integration server 10. As a result, a request for a search (for example, a search for a person such as a suspect) from the client terminal VW1 to the AI-integration server 10 is started.

The search screen WD1 shown in FIG. 5 has an input field CON2 for various search conditions regarding an object (for example, a vehicle) shown in the captured video data. When the vehicle information is searched, the captured video data of one or more cameras selected or designated by the operation of the operator is a search target.

Similar to the input field CON1, the input field CON2 for search conditions is provided with respective display areas so that Time & Date), Camera, Search mode, and the search icon SC1 can be input or selected.

Upon detecting that the Vehicle icon OB3 has been pressed by the operation of the operator, the investigation assist application displays a vehicle detail screen WD3 on the display device 116 (see FIG. 5). The vehicle detail screen WD3 prompts the operator to select vehicle characteristic elements (examples of an object feature element) for characterizing a vehicle such as a getaway vehicle. The vehicle characteristic elements are, specifically, a vehicle type (Type) and a vehicle color (Color). In FIG. 5, a plurality of options CLP2 and CLP3 are provided for each of the vehicle type and the vehicle color. The investigation assist application sets at least one vehicle characteristic element selected by the operation of the operator as a vehicle search condition CH2. For example, in the vehicle search condition CH2 of FIG. 5, the object feature elements of "Sedan", "Van", "sports utility vehicle (SUV)", and "white" are selected.

The search icon SC1 is pressed by the operation of the operator when a search using the set vehicle search condition CH2 is started. Upon detecting that the search icon SC1 has been pressed, the investigation assist application generates a vehicle search processing request including the vehicle search condition CH2 and sends the request to the AI-integration server 10. As a result, a request for searching (searching for a vehicle such as a getaway vehicle) from the client terminal VW1 to the AI-integration server 10 is started.

Figure 6:
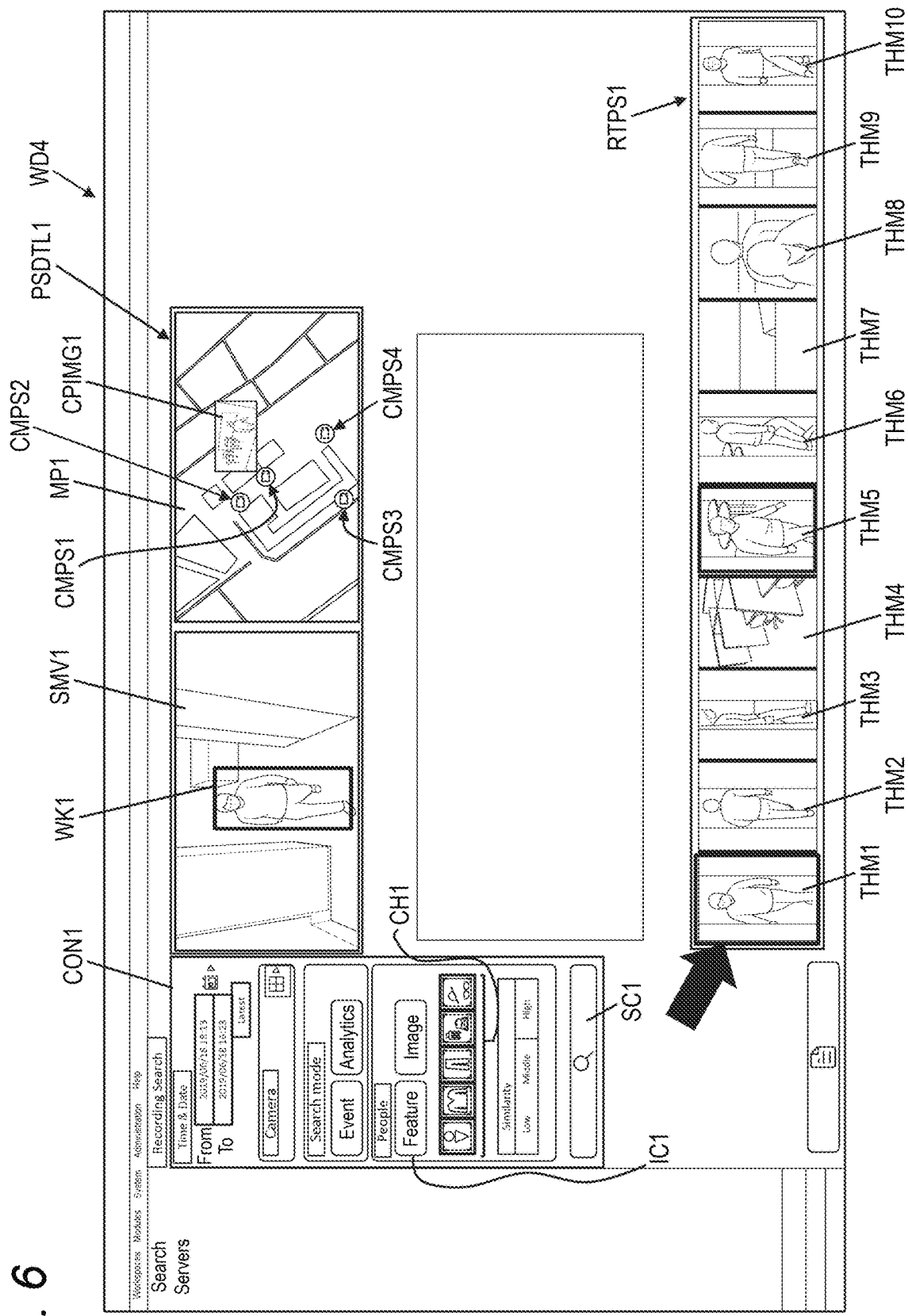
FIG. 6 is a diagram showing an example of a person search result screen displayed on the client terminal.
Figure 7:
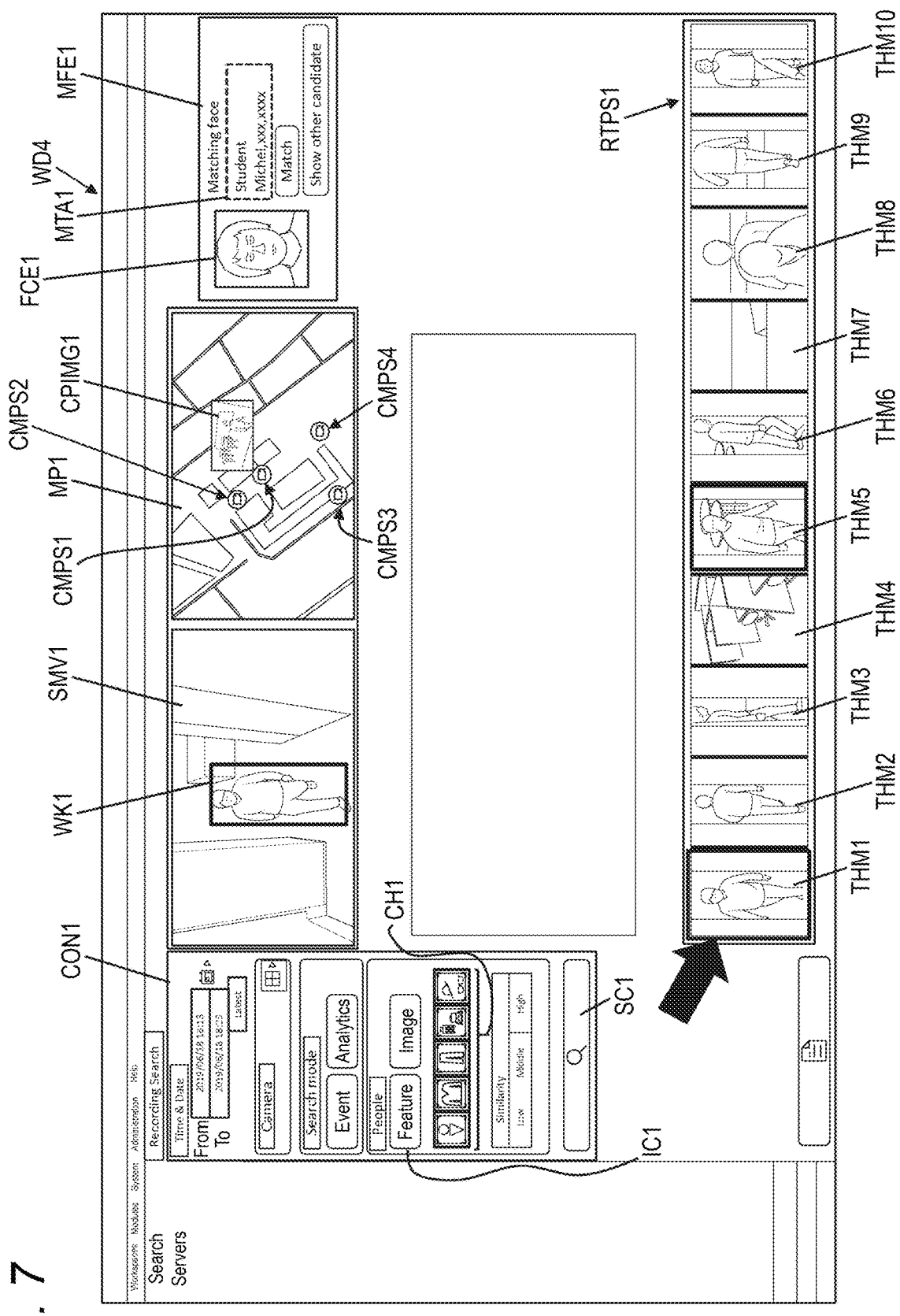
FIG. 7 is a diagram showing an example of a person search result screen displayed on the client terminal.

FIGS. 6 and 7 are diagrams showing an example of a person search result screen displayed on the client terminal VW1. When the client terminal VW1 receives the result (search result) of the search processing of a person such as a suspect from the AI-integration server 10, the investigation assist application displays a search result screen WD4 shown in FIG. 6 or 7 on the display device 116. The search result includes, for example, a thumbnail for each person (that is, a person who satisfies the person search condition CH1. The same applies hereinafter), a captured date and time of captured video data of a camera that is the source of the thumbnail, identification information of the camera, and a score of the search processing by the person search server 60.

The search result screen WD4 shown in FIG. 6 includes the input field CON1 for various search conditions regarding an object (for example, a person) shown in the captured video data, a display area RTPS1 of thumbnails of one or more corresponding persons included in the search result, and a person detail display area PSDTL1. The person detail display area PSDTL1 includes a display area of a selected person video SMV1 and a display area of a road map data MP1.

When the client terminal VW1 receives the person search result from the AI-integration server 10, the investigation assist application displays thumbnails THM1, THM2, THM3, THM4, THM5, THM6, THM7, THM8, THM9, and THM10 of one or more persons included in the search result side by side in the display area RTPS1. Here, each thumbnail displayed in the display area RTPS1 indicates an image cut out by the person search server 60 from the captured video data of the camera so that a rough whole picture of the person is displayed, for example. The investigation assist application may display the persons in the search result in descending order of score (for example, a probability value indicating the likelihood of the search result obtained based on the processing of the AI engine configured by the processor 61), or may display the persons in the order of oldest or newest captured date and time when the persons were captured.

Further, upon detecting that any one of the thumbnails THM1 to THM10 (for example, the thumbnail THM1) has been selected by the operation of the operator (see the thick arrow in FIG. 6), the investigation assist application requests the video management server 40 for captured video data satisfying the identification information of the camera corresponding to the thumbnail THM1 and the captured date and time. Upon receiving the captured image data (that is, the data of the selected person image SMV1) sent from the video management server 40 in response to this request, the investigation assist application displays the selected person video SMV1 in the person detail display area PSDTL1. Further, the investigation assist application displays a camera installation location CMPS1 corresponding to the thumbnail THM1 on the road map data MP1 in a superimposed manner in the person detail display area PSDTL1.

The investigation assist application may display an outer frame WK1 emphasizing the whole picture of the person shown in the thumbnail THM1 (that is, a male wearing yellow long-sleeved clothes and black pants) on the selected person video SMV1 in a superimposed manner. Thereby, the operator can determine at a glance where in the selected person video SMV1 the person of the thumbnail THM1 is present.

The investigation assist application may display the icons indicating installation locations CMPS2, CMPS3, and CMPS4 of cameras other than the camera corresponding to the thumbnail THM1, and a snapshot CHMG1 of an image of one scene of the video data captured by the camera of the installation location CMPS1 on the road map data MP1 in a superimposed manner. Thereby, the operator can easily confirm the snapshot of the scene captured by the camera showing the person of the thumbnail THM1 and the installation locations of the cameras other than the installation location CMPS1 of the camera.

The search result screen WD4 shown in FIG. 7 includes the input field CON1 for various search conditions regarding an object (for example, a person) shown in the captured video data, the display area RTPS1 of thumbnails of one or more corresponding persons included in the search result, and a person detail display area PSDTL2. The person detail display area PSDTL2 includes a display area of the selected person video SMV1, a display area of the road map data MP1, and a display area of a selected person detail information MFE1. The description of the display of the thumbnails of one or more relevant persons included in the search result and the description regarding the display of the selected person video SMV1 and the road map data MP1 have been described with reference to FIG. 6, and therefore the description in FIG. 7 will be omitted.

Upon detecting that any one of the thumbnails THM1 to THM10 (for example, the thumbnail THM1) has been selected by the operation of the operator (see the thick arrow in FIG. 6), the investigation assist application generates a face image in which the face part of the person corresponding to the thumbnail THM1 is cut out. The investigation assist application generates a verification instruction including the generated face image data and sends the instruction to the AI-integration server 10. The AI-integration server 10 sends the verification instruction sent from the client terminal VW1 to the face authentication server 50, receives the verification processing result of the face authentication server 50, and sends the result to the client terminal VW1. The investigation assist application further displays the selected person detail information MFE1 including a face image FCE1 and personal information MTA1 of the hit person (that is, a person who matches a person such as a person with a criminal record registered in the blacklist data of the face authentication server 50) included in the verification processing result sent from the AI-integration server 10 in the person detail display area PSDTL2.

Figure 8:
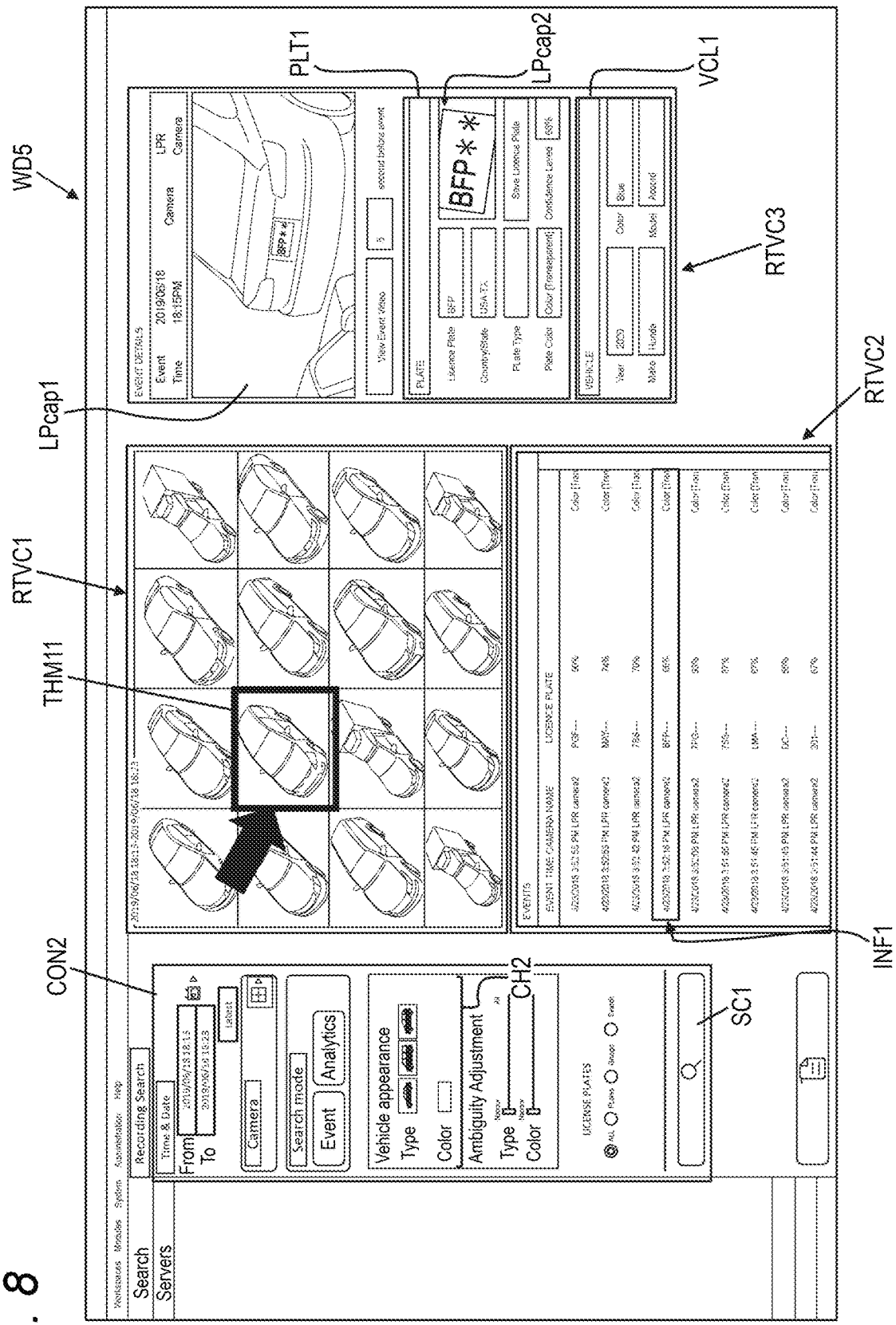
FIG. 8 is a diagram showing an example of a vehicle search result screen displayed on the client terminal.
Figure 9:
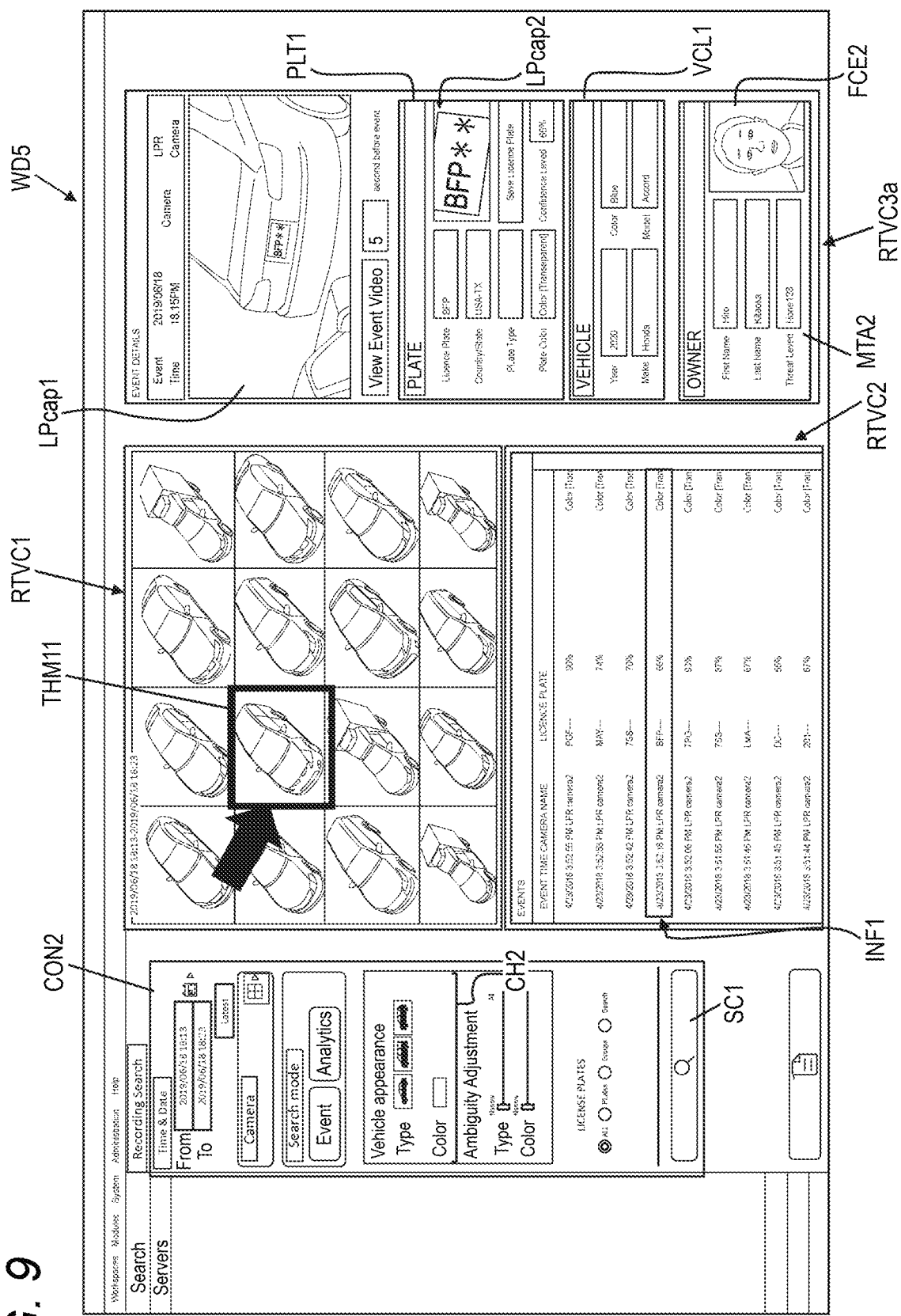
FIG. 9 is a diagram showing an example of a vehicle search result screen displayed on the client terminal.

FIGS. 8 and 9 are diagrams showing an example of a vehicle search result screen displayed on the client terminal VW1. When the client terminal VW1 receives the result (search result) of the search processing of a vehicle such as a getaway vehicle from the AI-integration server 10, the investigation assist application displays a search result screen WD5 shown in FIG. 8 or 9 on the display device 116. The search result includes, for example, a thumbnail for each vehicle (that is, a vehicle satisfying the vehicle search condition CH2. The same applies hereinafter), a captured date and time of captured video data of a camera which is a source of the thumbnail, identification information of the camera, and a score of the search processing by the vehicle search server 80.

The search result screen WD5 shown in FIG. 8 includes the input field CON2 for various search conditions regarding an object (for example, a vehicle) shown in the captured video data, a display area RTVC1 of thumbnails of one or more corresponding vehicles included in the search result, an event detail display area RTVC2, and a selected vehicle detail display area RTVC3.

When the client terminal VW1 receives the vehicle search result from the AI-integration server 10, the investigation assist application displays thumbnails of one or more corresponding vehicles (for example, 16 thumbnails in FIG. 8) included in the search result side by side in the display area RTVC1. Here, each thumbnail displayed in the display area RTVC1 is, for example, an image cut out by the vehicle search server 80 from the captured video data of the camera so that a rough overall image of the vehicle is displayed. The investigation assist application may display the vehicles in the search result in descending order of score (for example, a probability value indicating the likelihood of the search result obtained based on the processing of the AI engine), or display the vehicles in order of oldest or newest captured date and time when the vehicles were captured. The investigation assist application displays event information including at least the captured date and time, name, and license plate of the camera that has captured each corresponding vehicle (an example of the event) in the event detail display area RTVC2 along with the display of the thumbnail of each corresponding vehicle in the display area RTVC1.

Further, upon detecting that any one (for example, the thumbnail THM11) has been selected by the operation of the operator (see the thick arrow in FIG. 8), the investigation assist application requests the video management server 40 for captured video data satisfying the identification information of the camera corresponding to the thumbnail THM11 and the captured date and time. Upon receiving that the captured video data (that is, the data of the selected vehicle video LPcap1) sent from the video management server 40 in response to this request, the investigation assist application displays the data of the selected vehicle video LPcap1 in the selected vehicle detail display area RTVC3. Further, the investigation assist application highlights an event information INF1 corresponding to the vehicle selected by the thumbnail THM11.

The investigation assist application displays not only the data of the selected vehicle video LPcap1 but also a license plate detail display area PLT1 including a license plate image LPcap2 of the selected vehicle and a detail display area VCL1 of the selected vehicle in the selected vehicle detail display area RTVC3. The license plate image LPcap2 is, for example, an image in which the license plate part shown in the data of the selected vehicle video LPcap1 is cut out by the video management server 40 or the client terminal VW1. Therefore, the operator can confirm details such as the image of the vehicle, the license plate, the vehicle type, and the vehicle color of the vehicle in question (see the thick arrow in FIG. 8) among the vehicles that satisfy the vehicle search condition CH2 at a glance by browsing the search result screen shown in FIG. 8.

The search result screen WD5 shown in FIG. 9 includes the input field CON2 for various search conditions regarding an object (for example, a vehicle) shown in the captured video data, the display area RTVC1 of thumbnails of one or more corresponding vehicles included in the search result, the event detail display area RTVC2, and a selected vehicle detail display area RTVC3a. The selected vehicle detail display area RTVC3a further includes a selected vehicle owner detail display area in addition to the data display area of the selected vehicle video LPcap1, the license plate detail display area PLT1, and the detail display area VCL1 of the selected vehicle. The description of the thumbnail display area RTVC1, the event detail display area RTVC2, the data display area of the selected vehicle video LPcap1, the license plate detail display area PLT1, and the detail display area VCL1 of the selected vehicle have been described with reference to FIG. 8, and therefore the description in FIG. 9 will be omitted.

Upon detecting that one (for example, the thumbnail THM11) has been selected by the operation of the operator (see the thick arrow in FIG. 9), the investigation assist application extracts the license plate information from the vehicle information corresponding to the vehicle corresponding to the thumbnail THM11. The investigation assist application generates a verification instruction including the extracted license plate information and sends the instruction to the AI-integration server 10. The AI-integration server 10 sends the verification instruction sent from the client terminal VW1 to the LPR server 90, receives the verification processing result of the LPR server 90, and sends the result to the client terminal VW1. The investigation assist application displays a face image FCE2 and personal information MTA2 of the purchaser (that is, the purchaser of the vehicle corresponding to the license plate information that matches the license plate information registered in the license plate list data of the LPR server 90) of the hit vehicle included in the verification processing result sent from the AI-integration server 10 in the selected vehicle owner detail display area.

Further, in Embodiment 1, the investigation assist application can selectively cause the AI-integration server 10 to perform a search (so-called AND search) using search conditions that encompass a plurality of different objects (that is, satisfies all), or a search (so-called OR search) that adds up the results of individually searching a plurality of different objects. Which of the AND search and the OR search is to be executed can be selected, for example, by the operation of the operator.

Figure 10:
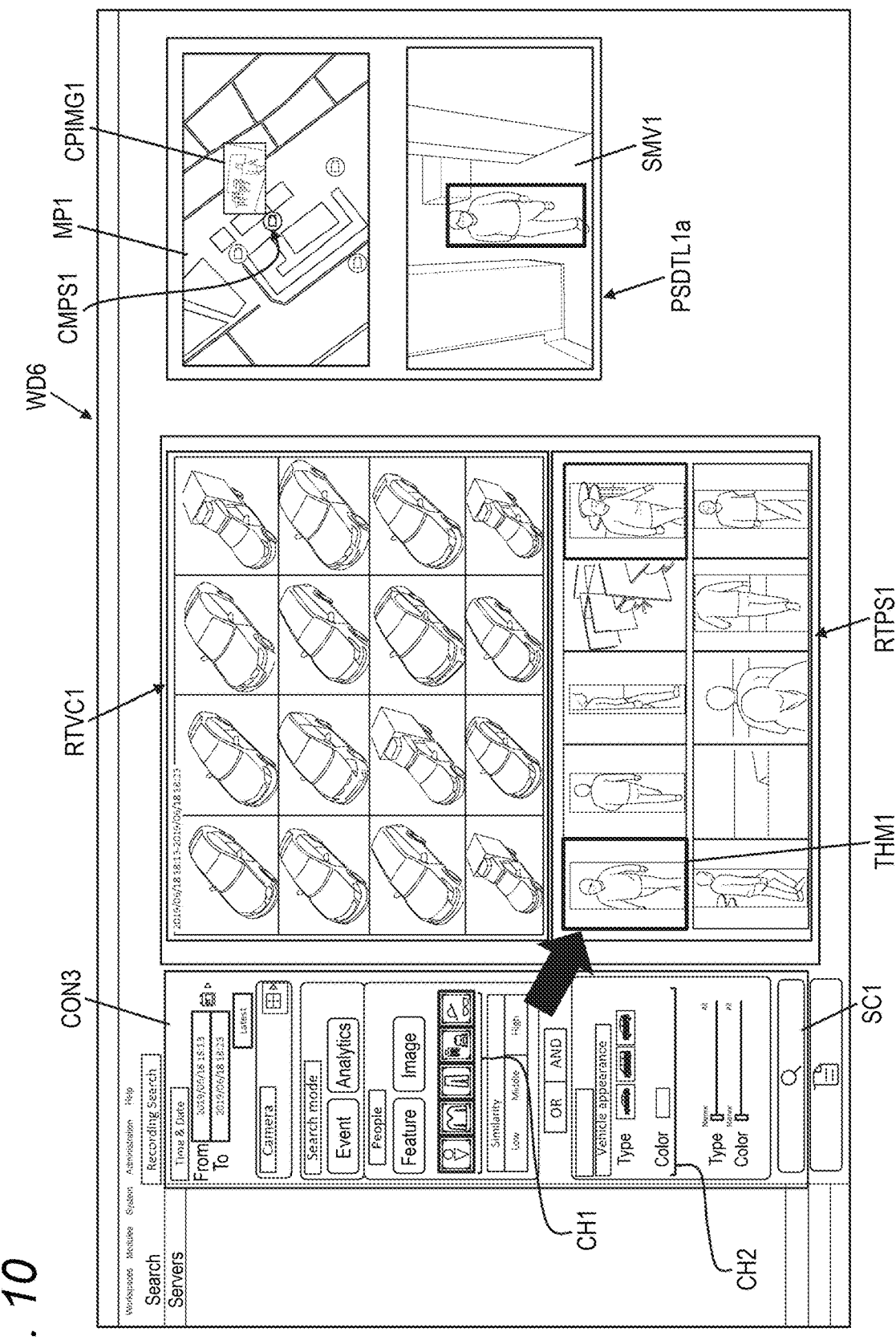
FIG. 10 is a diagram showing an example of a search result screen of an OR search displayed on the client terminal.

FIG. 10 is a diagram showing an example of a search result screen of an OR search displayed on the client terminal VW1. A search result screen WD6 shown in FIG. 10 shows a search result of an OR search for logically adding the results of individually searching a plurality of different objects (specifically, a person and a vehicle). Specifically, the search result screen WD6 shows the search result including both the search result of the search result screen WD4 shown in FIG. 6 (that is, see the display area RTPS1 of thumbnails of one or more corresponding persons) and the search result of the search result screen WD5 shown in FIG. 8 (that is, see the display area RTVC1 of thumbnails of one or more corresponding vehicles). The search result screen WD6 shown in FIG. 10 includes at least an input field CON3 for various search conditions regarding a plurality of different objects (for example, persons and vehicles) shown in the captured video data, the display area RTPS1 of thumbnails of one or more corresponding persons included in the search result, and a person detail display area PSDTL1a.

In the input field CON3 for search conditions, both the person search condition CH1 (see FIG. 4) and the vehicle search condition C112 (see FIG. 5) are selected and set by the operation of the operator in order to search for each of a plurality of different objects (specifically, persons and vehicles). In FIG. 10, since the content of the person search condition CH1 is the same as the person search condition CH1 shown in FIG. 4, and the content of the vehicle search condition CH2 is the same as the vehicle search condition CH2 shown in FIG. 5, detailed description thereof will be omitted.

Upon detecting that a thumbnail of a person (for example, the thumbnail THM1) is selected from a plurality of thumbnails of a person and a plurality of thumbnails of a vehicle (see the thick arrow in FIG. 10), as in the case of FIG. 6, the investigation assist application requests the video management server 40 for captured video data satisfying the identification information of the camera corresponding to the thumbnail THM1 and the captured date and time. Upon receiving the captured video data (that is, the data of the selected person video SMV1) sent from the video management server 40 in response to this request, the investigation assist application displays the selected person video SMV1 in the person detail display area PSDTL1a. Further, the investigation assist application displays the installation location CMPS1 of the camera corresponding to the thumbnail THM1 and the snapshot CPIMG1 of an image of one scene of the captured video data of the camera of the installation location CMPS1 on the road map data MP1 in a superimposed manner in the person detail display area PSDTL1a. Thereby, the operator can easily confirm the snapshot of the scene captured by the camera showing the person of the thumbnail THM1 and the installation location of the camera CMPS1.

On the other hand, although not shown in FIG. 10, upon detecting that a vehicle thumbnail (for example, the thumbnail THM11) has been selected from the plurality of thumbnails of a person and the plurality of thumbnails of a vehicle, as in the case of FIG. 8, the investigation assist application requests the video management server 40 for captured video data satisfying the identification information of the camera corresponding to the thumbnail THM11 and the captured date and time. Upon receiving the captured video data (that is, the data of the selected vehicle video LPcap1) sent from the video management server 40 in response to this request, the investigation assist application displays the content of the event detail display area RTVC2 and the content of one of the selected vehicle detail display areas RTVC3 and RTVC3a of FIG. 8 or FIG. 9 instead of the content of the person detail display area PSDTL1a. As a result, the operator can confirm the snapshot of the scene captured by the camera showing the vehicle of the thumbnail THM11, the vehicle license plate of the thumbnail THM11, and details such as vehicle type and vehicle color at a glance.

Figure 11:
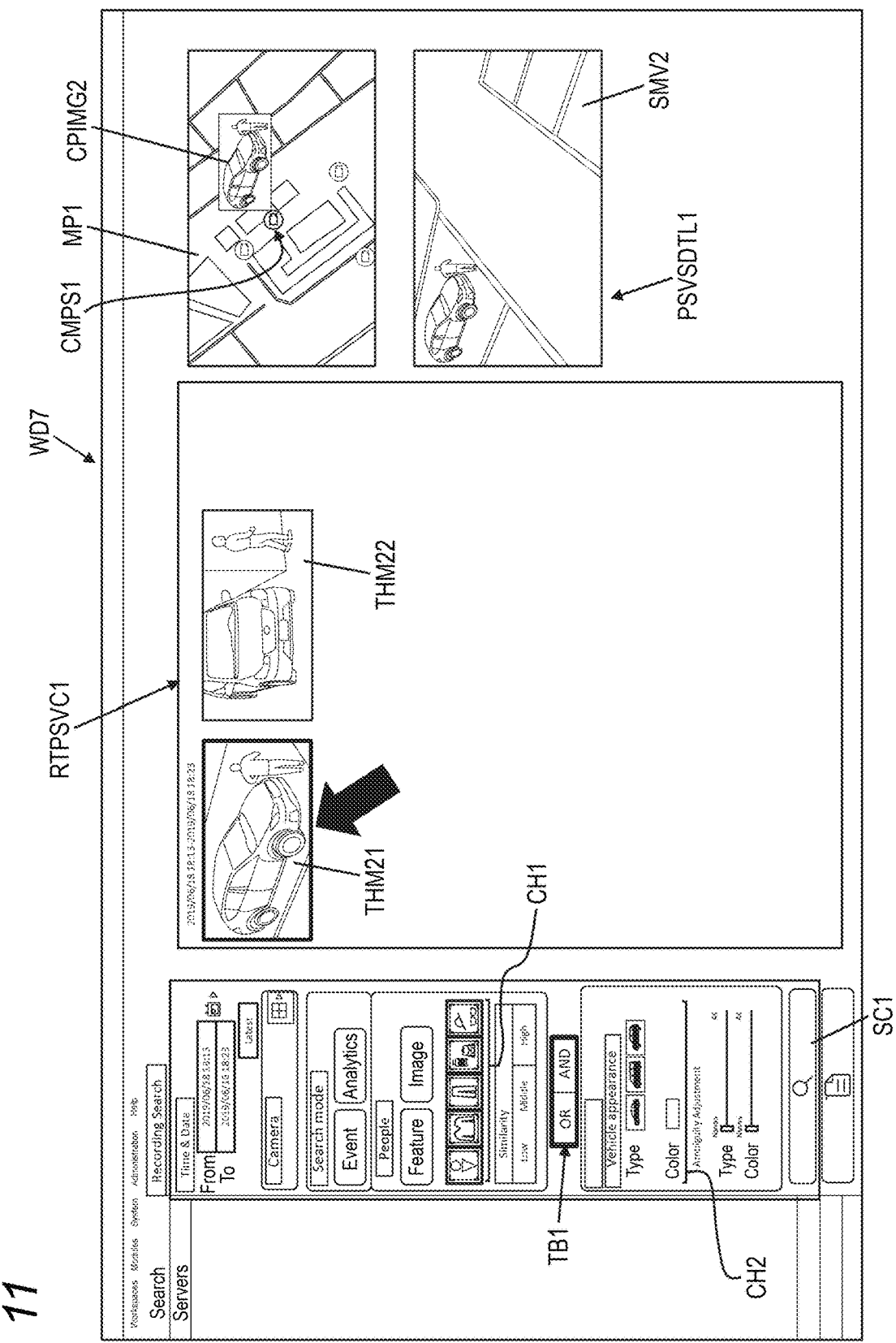
FIG. 11 is a diagram showing an example of a search result screen of an AND search displayed on the client terminal.

FIG. 11 is a diagram showing an example of a search result screen of the AND search displayed on the client terminal VW1. The search result screen WD7 shown in FIG. 11 shows a search result of an AND search for logically integrating the results of individually searching a plurality of different objects (specifically, a person and a vehicle). Specifically, the search result screen WD7 includes at least the input field CON3 for various search conditions regarding a plurality of different objects (for example, person, vehicle) shown in the captured video data, a display area RTPSVC1 of thumbnails THM21 and THM22 in which at least one person and one vehicle included in the search result appear, and a person vehicle detail display area PSVSDTL1.

In the input field CON3 for search conditions, both the person search condition CH1 (see FIG. 4) and the vehicle search condition CH2 (see FIG. 5) are selected and set by the operation of the operator in order to search for each of a plurality of different objects (specifically, persons and vehicles). Further, in the input field CON3 of FIG. 11, a tab option TB1 capable of switching between an AND search and an OR search is displayed. This tab option TB1 may be displayed in the input field CON3 in FIG. 10. For example, in the person search condition CH1 in FIG. 11, the object feature elements "male", "wearing black long-sleeved clothes for upper body", "wearing gray pants for lower body", "no bag", and "no accessories" are selected. In the vehicle search condition CH2 of FIG. 11, the object feature elements of "Sedan", "Van", "SUV (Sports Utility Vehicle)", and "orange" are selected.

Upon detecting that one of the thumbnails THM21 and THM22 (for example, the thumbnail THM21) showing the person and the vehicle has been selected (see the thick arrow in FIG. 11), as in the case of FIG. 6, the investigation assist application requests the video management server 40 for captured video data satisfying the identification information of the camera corresponding to the thumbnail THM 21 and the captured date and time. Upon receiving the captured video data (that is, the data of the selected vehicle video SMV2) sent from the video management server 40 in response to this request, the investigation assist application displays the selected person vehicle video SMV2 in the person vehicle detail display area PSVSDTL1. Further, the investigation assist application displays the installation location CMPS1 of the camera corresponding to the thumbnail THM21 and a snapshot CPIMG2 of an image of one scene of the captured video data of the camera of the installation location CMPS1 on the road map data MP1 in a superimposed manner in the person detail display area PSVSDTL1. Thereby, the operator can easily confirm the snapshot of the scene captured by the camera showing both the person and the vehicle of the thumbnail THM21 and the installation location CMPS1 of the camera.

Figure 12:
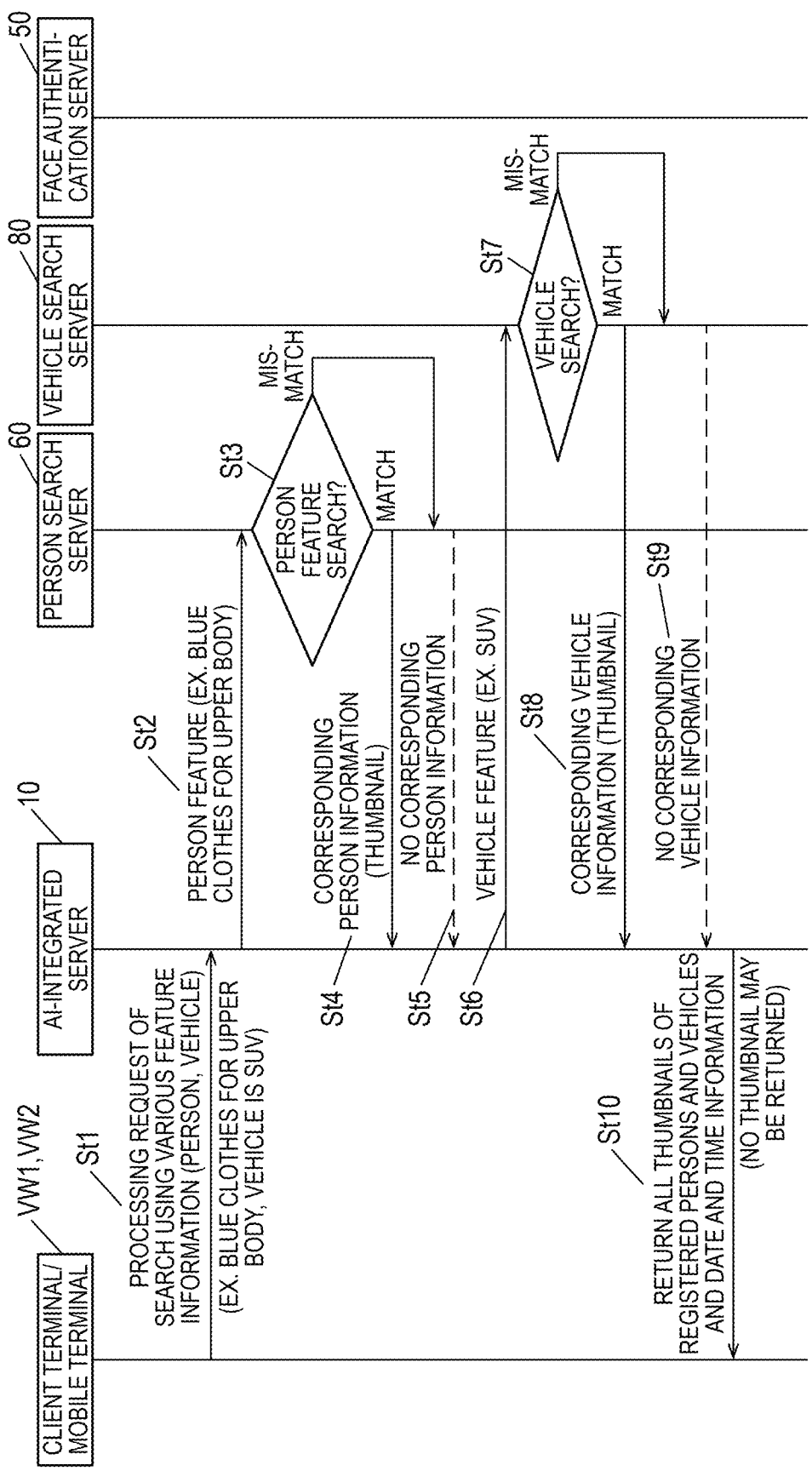
FIG. 12 is a sequence diagram showing an operation procedure example in time series regarding a first investigation scenario in the investigation assist system according to Embodiment 1.
Figure 13:
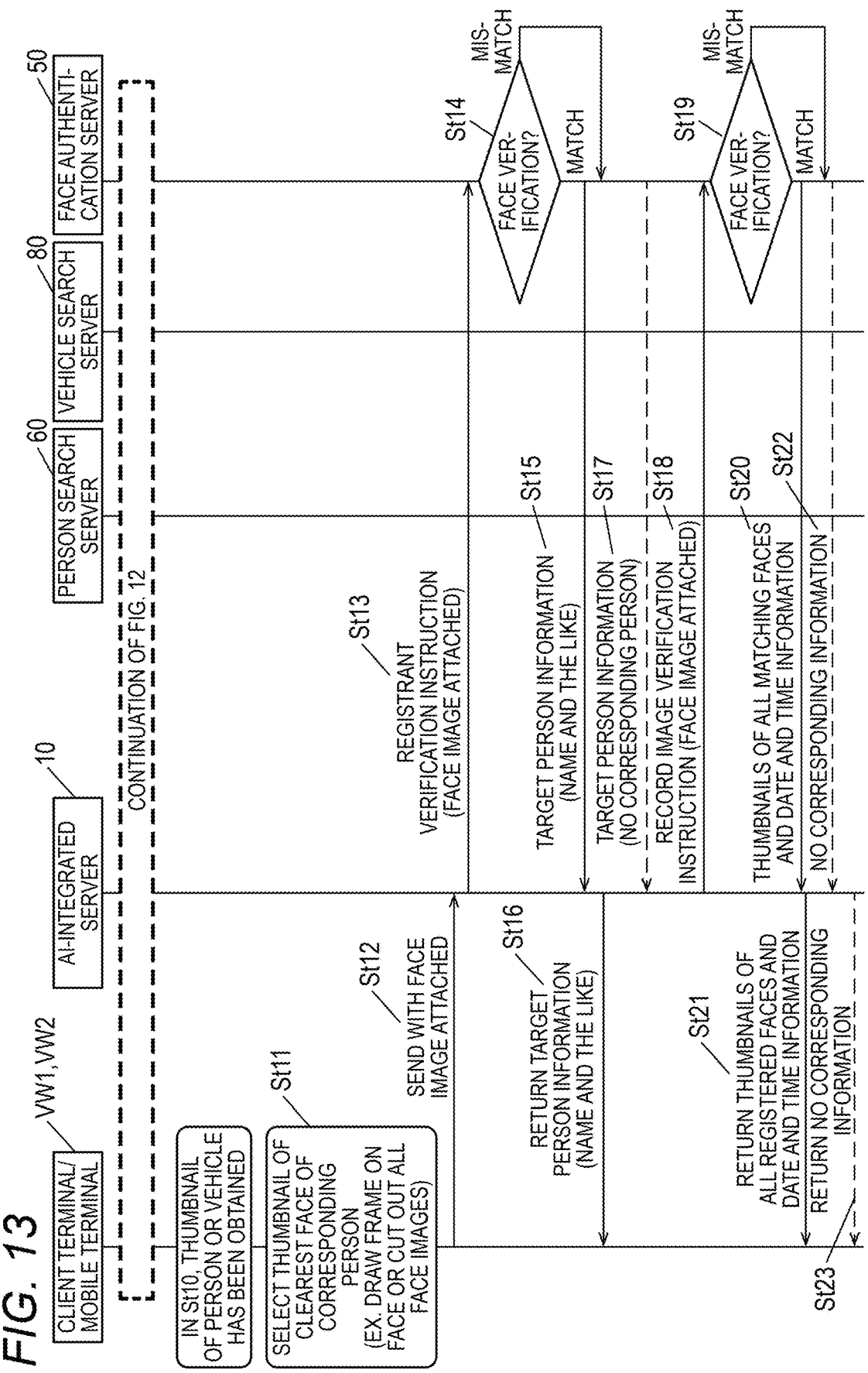
FIG. 13 is a sequence diagram showing an operation procedure example in time series regarding a second investigation scenario in the investigation assist system according to Embodiment 1.

Next, an operation procedure example assuming an investigation scenario of the investigation assist system 1 according to Embodiment 1 will be described with reference to FIGS. 12 and 13, respectively. FIG. 12 is a sequence diagram showing an operation procedure example in time series regarding a first investigation scenario in the investigation assist system according to Embodiment 1. FIG. 13 is a sequence diagram showing an operation procedure example in time series regarding a second investigation scenario in the investigation assist system according to Embodiment 1.

In the first investigation scenario, an example in which powerful eyewitness information is obtained for each of a person such as a suspect and a vehicle such as a getaway vehicle, and the person or vehicle shown in the captured video data of the camera is individually searched by using the eyewitness information as a search condition, and then the processing result of the search is displayed on the client terminal VW1 or the mobile terminal VW2 will be described. Hereinafter, for simplification of the description, an example in which a search processing request is sent from the client terminal VW1 to the AI-integration server 10 will be described, but a search processing request may be sent from the mobile terminal VW2 as well.

In FIG. 12, the client terminal VW1 generates a processing request for an OR search (see FIG. 10) including the person search condition CH1 characterizing a person and the vehicle search condition CH2 characterizing a vehicle by the operation of the operator and send the request to the AI-integration server 10 (SU). Here, the person search condition CH1 is, for example, a person whose upper body is wearing blue clothes. The vehicle search condition CH2 is, for example, a vehicle whose type is sports utility vehicle (SUV).

Upon receiving the processing request of an AND search from the client terminal VW1, the AI-integration server 10 first takes out the person search condition CH1 from the processing request sent in step St1 and sends a processing request for searching for a person who satisfies the person search condition CH1 to the person search server 60 (St2).

Based on the processing request from the AI-integration server 10, the person search server 60 refers to the database 62 and executes the search processing of a person that satisfies the person search condition CH1 (St3). When the person search server 60 extracts a person who matches the characteristics of the person search condition CH1 (St3, match), the person search server 60 returns a processing result (see above) including the thumbnail of the person to the AI-integration server 10 (St4). On the other hand, when the person search server 60 cannot extract a person who matches the characteristics of the person search condition CH1 (St3, mismatch), the person search server 60 returns a processing result indicating that there is no corresponding person information to the AI-integration server 10 (St5).

Following the step St4 or step St5, the AI-integration server 10 takes out the vehicle search condition CH2 from the processing request sent in step St1 and sends a processing request for searching for a vehicle satisfying the vehicle search condition CH2 to the vehicle search server 80 (St6).

Based on the processing request from the AI-integration server 10, the vehicle search server 80 refers to the database 82 and executes processing of searching for a vehicle satisfying the vehicle search condition CH2 (St7). When the vehicle search server 80 extracts a vehicle matching the characteristics of the vehicle searching condition CH2 (St7, match), the vehicle search server 80 returns a processing result including the thumbnail of the vehicle (see above) to the AI-integration server 10 (St8). On the other hand, when the vehicle search server 80 cannot extract the vehicle that matches the characteristics of the vehicle search condition CH2 (St7, mismatch), the vehicle search server 80 returns a processing result indicating that there is no corresponding vehicle information to the AI-integration server 10 (St9).

The AI-integration server 10 integrates (consolidates) the result of the person search by the person search server 60 (person information) and the result of the vehicle search by the vehicle search server 80 (vehicle information), including the result that there is no corresponding person and the result that there is no corresponding vehicle, and returns the result to the client terminal VW1 (St10). The client terminal VW1 generates a search result screen showing the processing result of the search returned in step St10 and displays the screen on the display device 116 (see FIGS. 6, 8, 10, and 11).

Although FIG. 12 shows the example of an OR search of the person search and the vehicle search using the person search condition CH1 and the vehicle search condition CH2, the AI-integration server 10 performs the following when performing an AND search of the person search and the vehicle search. For example, the AI-integration server 10 sets the processing results of the person search sent in step St4 as the population of the subsequent vehicle search, and causes the vehicle search server 80 to search for a processing result that satisfies the vehicle search condition CH2 among the processing results of the person search.

In the second investigation scenario, like the first investigation scenario, an example in which each person or vehicle shown in the captured video data of the camera is individually searched, and the face image of a person is specifically specified (narrowed down) from the processing result of the search using the face authentication server 50, and the processing result is displayed on the client terminal VW1 or the mobile terminal VW2 will be described.

In FIG. 13, the client terminal VW1 acquires a processing result including thumbnails of a person, a vehicle, or both as processing subsequent to FIG. 12, and displays the processing result on the display device 116. The client terminal VW1 receives a selection of the clearest thumbnail selected by the operation of the operator from the thumbnails of the person and the vehicle displayed on the display device 116 (St11). The selection in step St11 may be performed, for example, by the operation of the operator, when it is detected by the function of the investigation assist application that a frame is drawn on the face in the selected thumbnail, or all thumbnails displayed on the display device 116 may be selected at random. Here, in order to simplify the description, it is assumed that a thumbnail in which a frame is drawn is selected in step St11 by the operation of the operator.

The client terminal VW1 generates a registrant verification instruction with the thumbnail selected in step St11 (for example, the face image cut out by the investigation assist application by selecting the face part of the person in question by the operator) attached, and sends the instruction to the AI-integration server 10 (St12). Upon receiving the registrant verification instruction from the client terminal VW1, the AI-integration server 10 sends the registrant verification instruction with the thumbnail attached to the face authentication server 50 (St13).

The face authentication server 50 refers to the blacklist data in the database 52 based on the registrant verification instruction from the AI-integration server 10, and searches for a registrant that matches the thumbnail (for example, face image) included in the registrant verification instruction (St14). When the face authentication server 50 extracts a face image that matches the thumbnail face image (St14, match), the face authentication server 50 returns a processing result including the target person information (for example, the face image and personal information) to the AI-integration server 10 (St15). The AI-integration server 10 sends the processing result returned from the face authentication server 50 to the client terminal VW1 (St16). The client terminal VW1 generates a search result screen showing the processing result of the search sent in step St16 and displays the screen on the display device 116 (see FIGS. 7 and 9).

On the other hand, when the face authentication server 50 cannot extract the face image that matches the face image of the thumbnail (St14, mismatch), the face authentication server 50 returns a processing result indicating that there is no corresponding person information to the AI-integration server 10 (St17).

Following step St15 or step St17, the AI-integration server 10 sends to the face authentication server 50 a processing request for a search for a face image that matches the face image of the same thumbnail using data other than blacklist data (St18).

The face authentication server 50 refers to the analysis result of the captured video data recorded in the past other than the blacklist data of the database 52 based on the processing request from the AI-integration server 10, and searches for a registrant that matches a thumbnail (for example, face image) included in the registrant verification instruction (St19). When the face authentication server 50 extracts a face image that matches the thumbnail face image (St19, match), the face authentication server 50 returns a processing result including the target person information (for example, the face image and personal information) to the AI-integration server 10 (St20). The AI-integration server 10 sends the processing result returned from the face authentication server 50 to the client terminal VW1 (St21). The client terminal VW1 generates a search result screen showing the processing result of the search sent in step St21 and displays the screen on the display device 116 (see FIGS. 7 and 9).

On the other hand, when the face authentication server 50 cannot extract the face image that matches the face image of the thumbnail (St19, mismatch), the face authentication server 50 returns a processing result indicating that there is no corresponding person information to the AI-integration server 10 (St22). The AI-integration server 10 may return the processing result indicating that there is no corresponding person information to the client terminal VW1 (St23). The execution of the processing of step St23 may be omitted.

As described above, the investigation assist system 1 according to Embodiment 1 includes a plurality of servers (for example, the face authentication server 50, the person search server 60, the vehicle search server 80, and the terminals (for example, the client terminal VW1 and the mobile terminal VW2)) and the AI-integration server 10 communicatively connected to the plurality of servers. Upon receiving the captured video data of each of the plurality of cameras C1 to C20, each of the servers performs a video analysis of an object (for example, a person or a vehicle) different from other servers with respect to an incident or the like. The AI-integration server 10 sends a search request for a corresponding object to the servers corresponding to the object feature element based on the input of a plurality of different object feature elements (for example, blue clothes for upper body, vehicle is SUV) from the terminal, and receives the search results of the corresponding object from the respective servers to integrate and display the search results on the terminal.

As a result, the investigation assist system 1 can perform a cross-sectional search using the characteristics of each of a plurality of different objects shown in the captured video data as search conditions. Therefore, the investigation assist system 1 can quickly and efficiently assist the specification of a suspect who has caused an incident or the like, and a getaway vehicle used by the suspect for escape, and improve the convenience of an investigation by an investigation agency such as the police.

In addition, the server performs a video analysis of the corresponding object by using an object search algorithm (for example, a person search algorithm, a vehicle search algorithm) different from other servers. The AI-integration server 10 has a common interface (for example, a common search algorithm) in which the object search algorithm used in each of the plurality of servers is generalized, and uses this common search algorithm to send a search request for the corresponding object to the server corresponding to the object feature element. As a result, even if the makers of the respective servers (specifically, the face authentication server 50, the person search server 60, and the vehicle search server 80) are different, the investigation assist system 1 can perform a cross-sectional search in which a plurality of objects (for example, a person and a vehicle) are mixed in response to a single search processing request from the client terminal VW1 or the mobile terminal VW2, and improve the convenience of the operator or the like.

Further, the search result of the corresponding object displayed on the terminal is a thumbnail of each of the plurality of persons. As a result, the operator or the like can easily and visually grasp the thumbnail showing the entire image of the person who is a candidate of the suspect such as the incident on the client terminal VW1 or the mobile terminal VW2.

In addition, based on selection of one of the thumbnails, the AI-integration server 10 causes the terminal to display a viewing screen of a captured video (the selected person video SMV1) of the person shown in the selected thumbnail and a map display screen (the road map data MP1) on which the installation location of the camera corresponding to the captured video is superimposed (see FIGS. 6 and 7). Thereby, the operator or the like can easily understand at a glance where in the selected person video SMV1 the person of the thumbnail THM1 is present, and further, the installation location of the camera CMPS1 where the person of the thumbnail THM1 is shown.

In addition, the plurality of servers include the face authentication server 50 that uses a face database (for example, blacklist data) in which the faces of persons are registered to perform verification. The AI-integration server 10 sends to the face authentication server 50 a verification request for the face of the person shown in the thumbnail based on selection of at least one of the thumbnails of the plurality of persons, and sends a verification result from the face authentication server 50 to the terminal. As a result, the operator or the like can easily grasp the face image and the personal information of the person in question in the thumbnails of a plurality of persons who can be candidates as the suspect in the incident.

Further, the search result of the corresponding object displayed on the terminal is a thumbnail of each of the plurality of vehicles. As a result, the operator or the like can easily and visually grasp, on the client terminal VW1 or the mobile terminal VW2, a thumbnail showing an overall image of a vehicle that is a candidate for a getaway vehicle on which a suspect in an incident or the like is riding.

Further, based on selection of one of the thumbnails, the AI-integration server 10 causes the terminal to displays a viewing screen of the captured video of the vehicle shown in the selected thumbnail (see selected vehicle video LPcap1) and a vehicle screen showing detailed vehicle information including the license plate of the vehicle (the image LPcap2 of the license plate) (see FIGS. 8 and 9). As a result, the operator or the like can finely confirm the features of the getaway vehicle in the selected vehicle video LPcap1 and easily grasp the information of the license plate at a glance.

Further, the plurality of servers include a license authentication server (for example, LPR server 90) that uses a vehicle owner database (for example, license plate list data) in which the face image and personal information of the vehicle owner are registered in association with the license plate, for verification. The AI-integration server 10 sends to the LPR server 90 a verification request for the owner information of the vehicle shown in the thumbnail based on selection of at least one of the thumbnails of the plurality of vehicles, and sends a verification result from the LPR server 90 to the terminal. As a result, the operator or the like can confirm the face image and the personal information of the owner of the selected vehicle video LPcap1 in detail on the search result screen (see FIG. 9), and can quickly confirm the whereabouts of the owner.

Further, the AI-integration server 10 sends a search request for the corresponding object to the server corresponding to the object feature element based on the input of a plurality of different object feature elements from the terminal, receives the search result of the corresponding object from each server, and displays the search result of one corresponding object on the terminal. As a result, the investigation assist system 1 can efficiently narrow down thumbnails showing both a person and a vehicle in the captured video data of the camera, and can effectively assist the operator or the like in grasping on the client terminal VW1 or the mobile terminal VW2 simply and intuitively. For example, when both a person and a vehicle are shown in one frame that constitutes a captured video, in order to search for such a frame with an AI engine or the like, it is necessary to prepare a large number of frames (captured images) that serve as correct training data, and machine learning is also complicated. However, according to the investigation assist system 1 according to Embodiment 1, since it is possible to perform a logical AND search of both searches after individually performing a person search and a vehicle search, it is expected that the need for the complicated machine learning described above will be eliminated and the efficiency of system building will be increased.

Embodiment 2

In Embodiment 2, triggered by the behavior detection server 70 detecting a predetermined action caused by at least one person, the AI-integration server 10 receives a search processing request from the client terminal VW1 or the mobile terminal VW2. Since the configuration of the investigation assist system 1 according to Embodiment 2 is the same as the configuration of the investigation assist system 1 according to Embodiment 1, the same reference numerals are given to the same components to simplify or omit the description, and different contents will be described. In Embodiment 2, the behavior detection server 70 is illustrated as a server that generates an alarm notification and sends the alarm notification to the AI-integration server 10, but as described in Embodiment 1 described above, the following description may be applied to the alarm notification generated when the corresponding object (for example, a face, a person, a vehicle, and a license plate) is detected by the server (for example, the face authentication server 50, the person search server 60, the vehicle search server 80, and the LPR server 90) other than the behavior detection server 70 during the video analysis.

As a result of the video analysis of the captured video data of each of the cameras C1 to C20, the behavior detection server 70 generates an alarm notification when the predetermined action (see above) is detected, and sends the alarm notification to the AI-integration server 10. The timing when the alarm notification is sent to the AI-integration server 10 is a normal monitoring time when the captured video data of each of the cameras C1 to C20 is sent to various servers (specifically, the face authentication server 50, the person search server 60, the behavior detection server 70, and the vehicle search server 80), and the alarm notification is suddenly sent to the AI-integration server 10 during the monitoring. Here, the alarm notification includes the content (type) of the predetermined action, and the captured date and time and the identification information of the camera corresponding to the captured video data in which the predetermined action is detected. The AI-integration server 10 sends the alarm notification suddenly sent from the behavior detection server 70 to the client terminal VW1 or the mobile terminal VW2.

Figure 14:
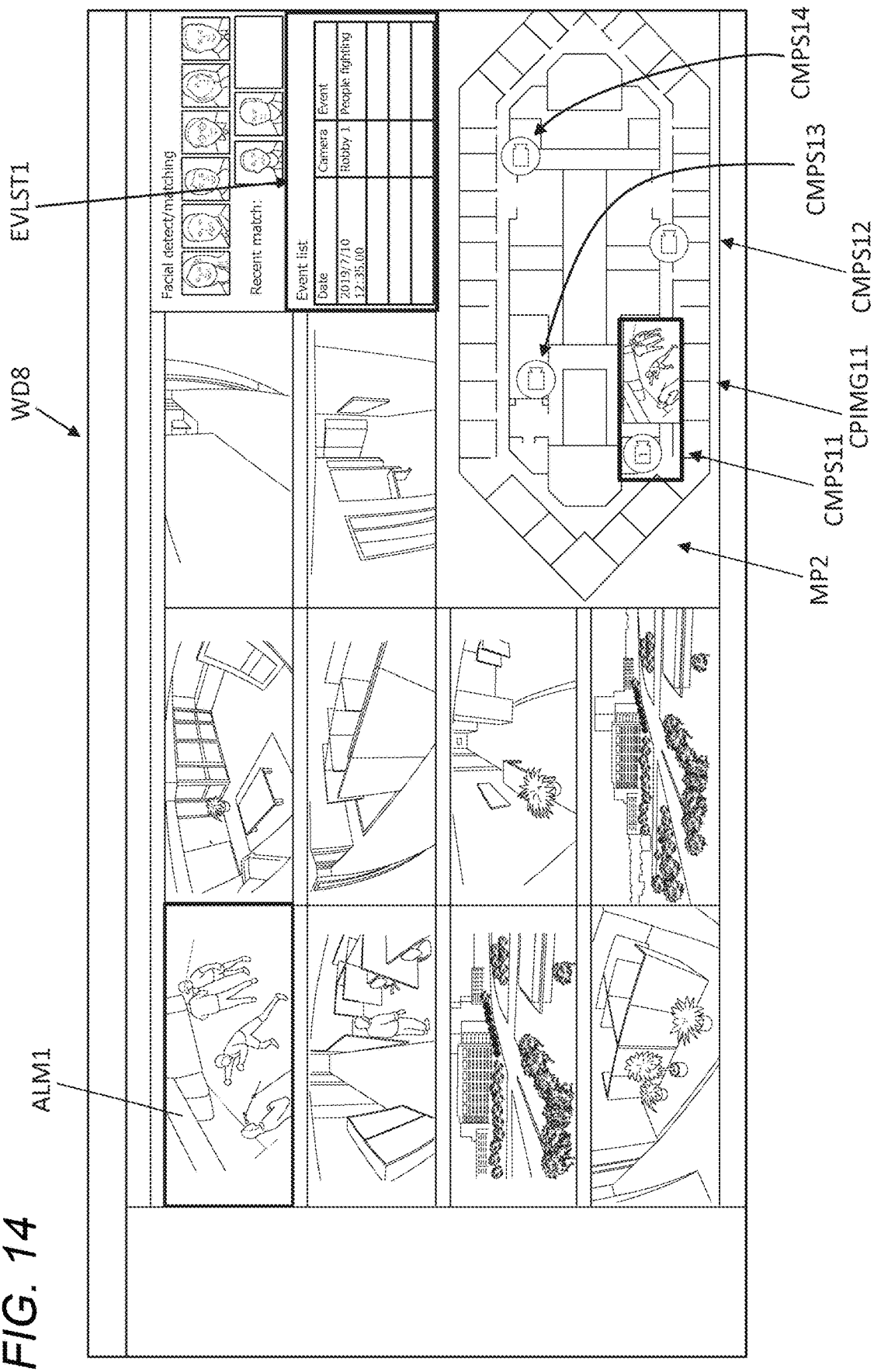
FIG. 14 is a diagram showing an example of an alarm monitoring screen displayed on the client terminal.

FIG. 14 is a diagram showing an example of an alarm monitoring screen displayed on the client terminal VW1. Similar to Embodiment 1, an alarm monitoring screen WD8 may be displayed on the mobile terminal VW2. In the alarm monitoring screen WD8 shown in FIG. 14, for example, the captured video data of each of the plurality of cameras is received and displayed on the client terminal VW1 via the AI-integration server 10 or the video management server 40. The alarm monitoring screen WD8 may display not only the display screen of the captured video data of the cameras but also map data MP2 (for example, map data on campus premises) with which the locations where the respective cameras are installed can be identified. On the map data MP2 of FIG. 14, for example, icons indicating the installation locations of four cameras CMPS11, CMPS12, CMPS13, and CMPS14 are displayed.

Upon detecting a fight between two persons as a predetermined action, the behavior detection server 70 generates an alarm notification including information indicating that there was a fight, the captured date and time corresponding to a captured video data ALM1 in which the fight was detected, and the identification information of the camera CMPS11, and sends the alarm notification to the AI-integration server 10. In the alarm monitoring screen WD8 of FIG. 14, the captured video data ALM1 in which a fight has been detected is highlighted by the client terminal VW1, the icon of the camera CMPS11 is highlighted (for example, displayed in red and bold), further, a snapshot CPIMG11 (captured image) showing one scene of the captured video of the camera CMPS11 is also displayed in a superimposed manner. Further, in the alarm monitoring screen WD8 of FIG. 14, every time a predetermined action is detected by the behavior detection server 70, the client terminal VW1 displays an event list EVLST1 regarding the occurrence of an action (an example of an event) in a superimposed manner. The event list EVLST1 shows the date and time when the action has been detected by the behavior detection server 70 (Date), the identification information of the camera that has captured the captured video data used to detect the action, and the content of an event (action) (for example, a fight) in association with each other.

Figure 15:
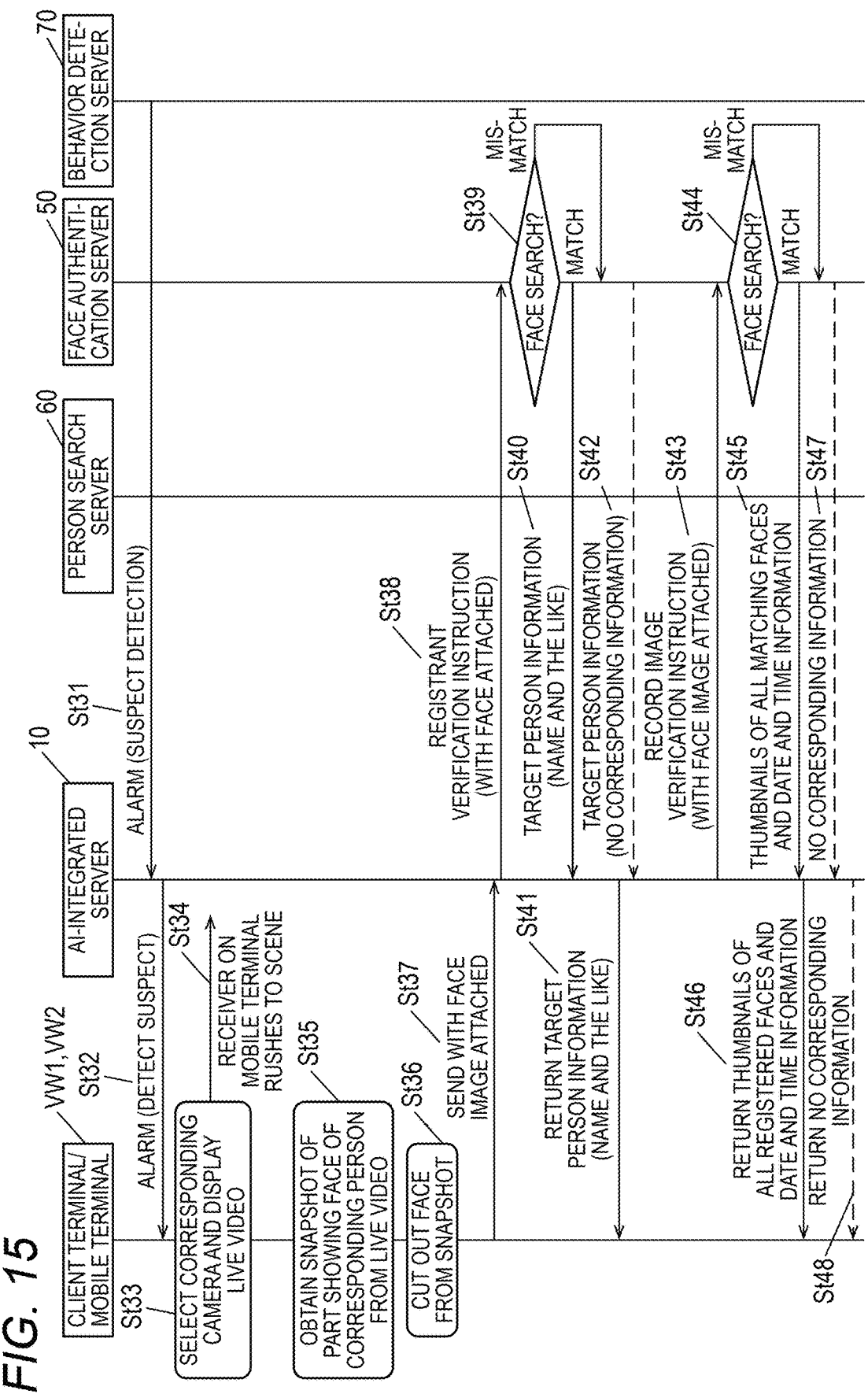
FIG. 15 is a sequence diagram showing an operation procedure example in time series regarding an image search using a live video in an investigation assist system according to Embodiment 2.
Figure 16:
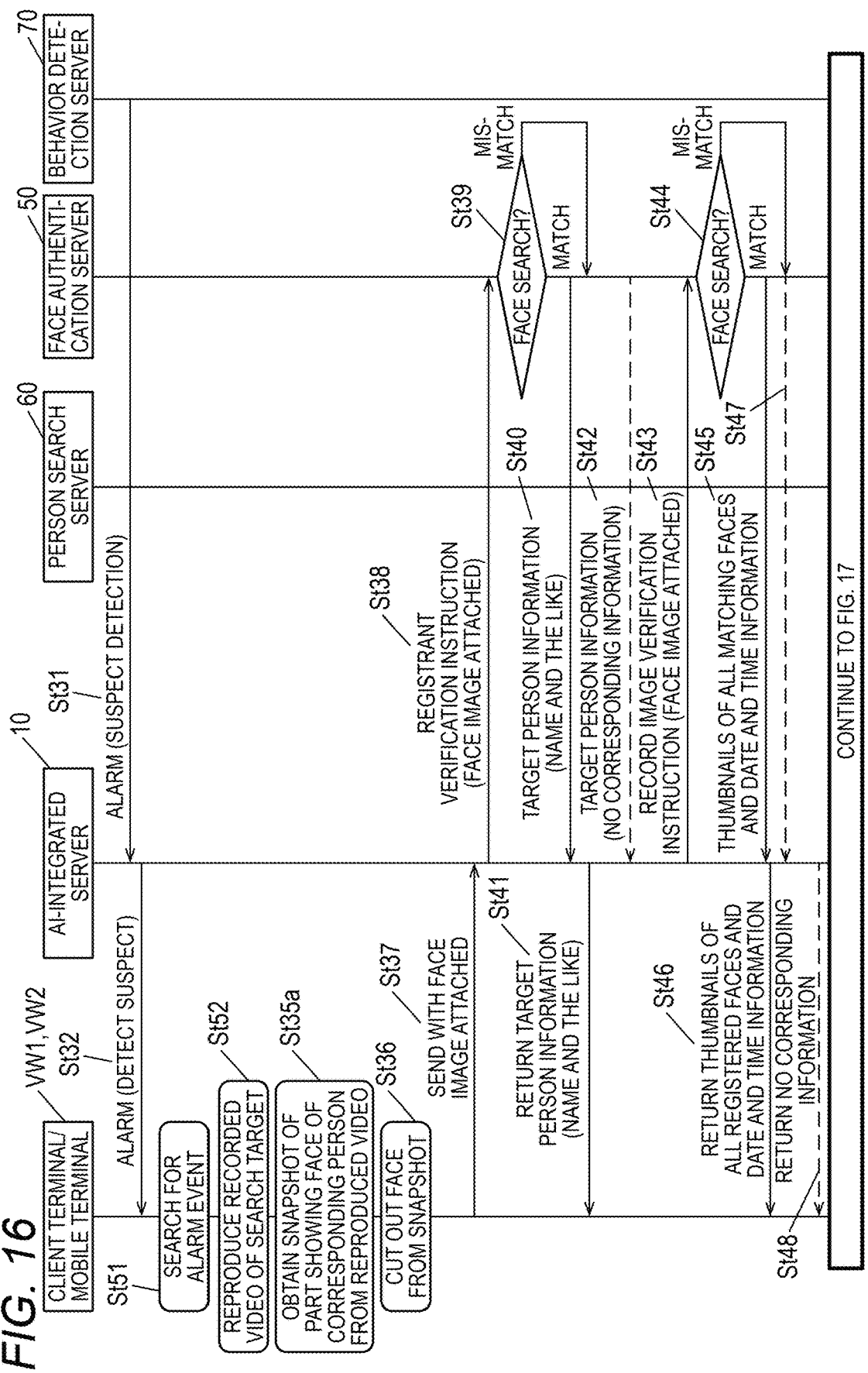
FIG. 16 is a sequence diagram showing an operation procedure example in time series regarding an image search using a past recorded video in the investigation assist system according to Embodiment 2.
Figure 17:
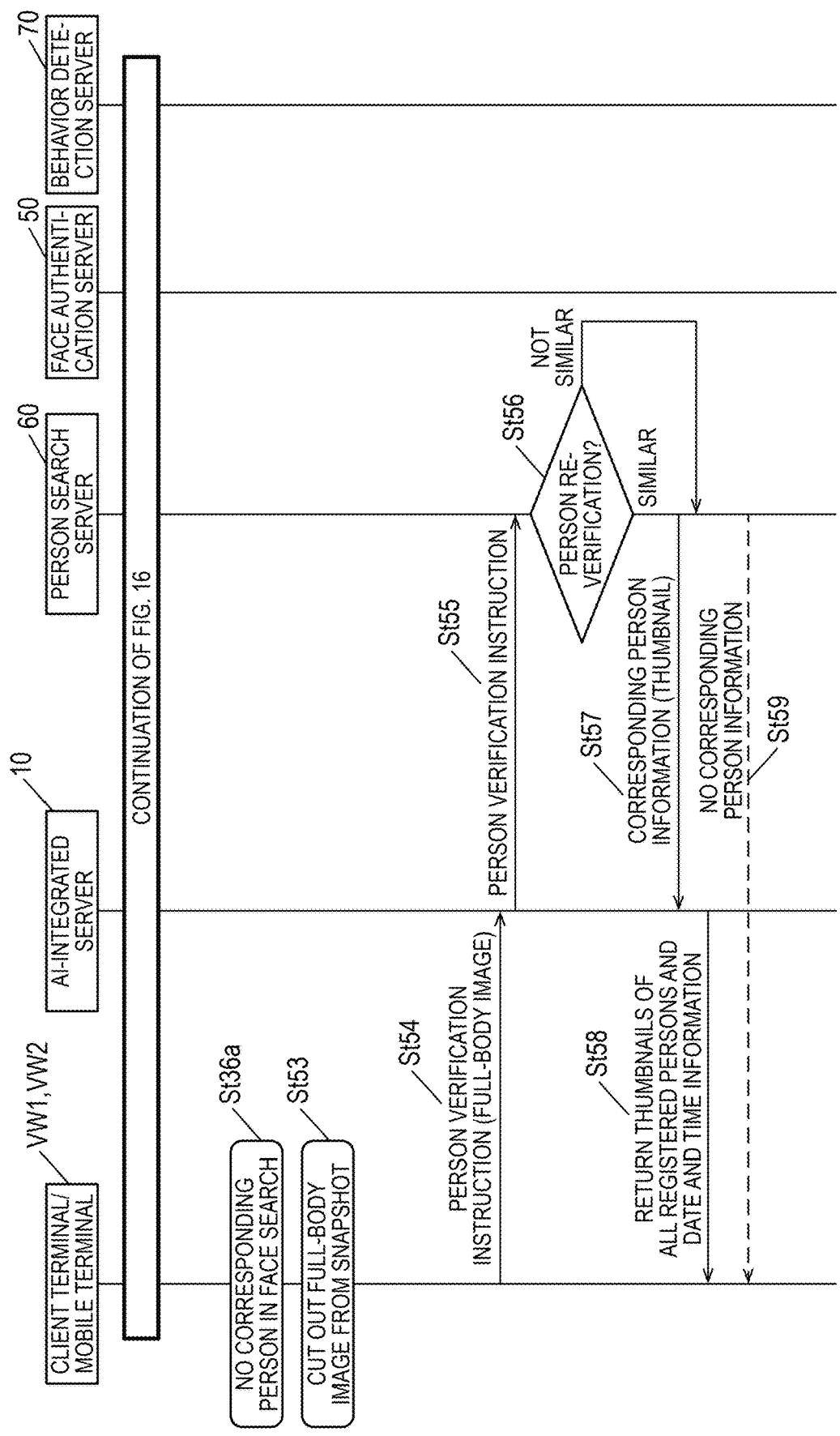
FIG. 17 is a sequence diagram showing an operation procedure example in time series regarding an image search using the past recorded video in the investigation assist system according to Embodiment 2.

Next, an example of an operation procedure of an image search using the live video or the past recorded video of the investigation assist system 1 according to Embodiment 2 will be described with reference to FIGS. 15 to 17, respectively. FIG. 15 is a sequence diagram showing an operation procedure example in time series regarding an image search using live video in the investigation assist system 1 according to Embodiment 2. FIGS. 16 and 17 are sequence diagrams showing an operation procedure example in time series regarding an image search using the past recorded video in the investigation assist system 1 according to Embodiment 2. In the description of FIGS. 16 and 17, the same content as the processing described in FIG. 15 is given the same step number to simplify or omit the description, and different content will be described.

In FIG. 15, upon detecting a fight between two persons as a predetermined action, the behavior detection server 70 generates an alarm notification including information indicating that there was a fight, the captured date and time corresponding to a captured video data ALM1 in which the fight was detected, and the identification information of the camera CMPS11, and sends the alarm notification to the AI-integration server 10 (St31). The AI-integration server 10 sends the alarm notification suddenly sent from the behavior detection server 70 to the client terminal VW1 (St32).

Based on the reception of the alarm notification sent from the AI-integration server 10, the investigation assist application of the client terminal VW1 highlights the captured video data ALM1 (for example, the red frame shown in FIG. 14) which is a live video of the camera corresponding to the identification information of the camera included in the alarm notification (St33). The policeman who is the user of the mobile terminal VW2 rushes to the scene where two persons get into a fight based on the receipt of the alarm notification (St34). The client terminal VW1 extracts a captured image (snapshot) showing a person (for example, two persons get into a fight) who is the target of an alarm notification from the captured video data ALM1 which is the target of an alarm notification (St35). Further, the client terminal VW1 cuts out the faces of the two persons get into a fight from the captured image (snapshot) extracted in step St35 (St36). The following processing is executed for each of the two persons, but for simplicity of description, processing for one of the two face images will be described.

The client terminal VW1 generates a registrant verification instruction with the face image of the person cut out in step St36 attached and sends the instruction to the AI-integration server 10 (St37). Upon receiving the registrant verification instruction from the client terminal VW1, the AI-integration server 10 sends the registrant verification instruction with the thumbnail attached to the face authentication server 50 (St38).

The face authentication server 50 refers to the blacklist data in the database 52 based on the registrant verification instruction from the AI-integration server 10, and searches for a registrant that matches the thumbnail (for example, face image) included in the registrant verification instruction (St39). When the face authentication server 50 extracts a face image that matches the cut-out face image (St39, match), the face authentication server 50 returns a processing result including the target person information (for example, the face image and personal information) to the AI-integration server 10 (St40). The AI-integration server 10 sends the processing result returned from the face authentication server 50 to the client terminal VW1 (St41). The client terminal VW1 generates a search result screen showing the processing result of the search sent in step St41 and displays the screen on the display device 116 (see FIG. 14).

On the other hand, when the face authentication server 50 cannot extract the face image that matches the face image of the thumbnail (St39, mismatch), the face authentication server 50 returns a processing result indicating that there is no corresponding person information to the AI-integration server 10 (St42).

Following step St41 or step St42, the AI-integration server 10 sends to the face authentication server 50 a processing request for a search for a face image that matches the face image of the same thumbnail using data other than blacklist data (St43).

The face authentication server 50 refers to the analysis result of the captured video data recorded in the past other than the blacklist data of the database 52 based on the processing request from the AI-integration server 10, and searches for a registrant who matches the face image included in the registrant verification instruction (St44). When the face authentication server 50 extracts a face image that matches the face image (St44, match), the face authentication server 50 returns a processing result including the target person information (for example, a face image and personal information) to the AI-integration server 10 (St45). The AI-integration server 10 sends the processing result returned from the face authentication server 50 to the client terminal VW1 (St46). The client terminal VW1 generates a search result screen showing the processing result of the search sent in step St45 and displays the screen on the display device 116 (see FIG. 14).

On the other hand, when the face authentication server 50 cannot extract the face image that matches the face image (St44, mismatch), the face authentication server 50 returns a processing result indicating that there is no corresponding person information to the AI-integration server 10 (St47). The AI-integration server 10 may return the processing result indicating that there is no corresponding person information to the client terminal VW1 (St48). The execution of the processing of step St48 may be omitted.

In FIG. 16, based on the reception of the alarm notification sent from the AI-integration server 10, the investigation assist application of the client terminal VW1 searches for the same alarm notification as the alarm notification sent from the AI-integration server 10 in step St32 among a plurality of previously received alarm notifications (alarm events) recorded in the recording device 112 of the client terminal VW1 (St51). The client terminal VW1 reads, from the recording device 112, the captured video data which is the past recorded video of the camera corresponding to the identification information of the camera included in the past alarm notification obtained by the search in step St51, and reproduces and displays the data (St52). The client terminal VW1 extracts a captured image (snapshot) showing a person (for example, two persons get into a fight) who is the target of the alarm notification from the past captured video data reproduced in step St52 (St35a). Further, when the face (for example, a face facing the front, suitable for face authentication) of the person who is taking the predetermined action (that is, the action included in the past alarm notification obtained by the search in step St51) is shown in the captured image (snapshot) extracted in step St35a, the client terminal VW1 cuts out the face image (St36). The processing in steps St37 to St48 is the same as that in FIG. 16, and thus description thereof will be omitted.

In FIG. 17, when the investigation assist application of the client terminal VW1 cannot extract the face of a person (for example, a face facing the front, suitable for face authentication) who is taking the predetermined action (that is, the action included in the past alarm notification obtained by the search in step St51) from the captured image (snapshot) extracted in step St35a (St36a), the investigation assist application cuts out a full-body image of the person from the snapshot (St53).

The client terminal VW1 generates a person re-verification instruction with the person image cut out in step St53 attached, and sends the instruction to the AI-integration server 10 (St54). Upon receiving the person re-verification instruction from the client terminal VW1, the AI-integration server 10 sends the person re-verification instruction with the person image attached to the person search server 60 (St55).

The person search server 60 refers to the video analysis result of the captured video data stored in the database 62 based on the person re-verification instruction from the AI-integration server 10, and searches for a person who matches or is similar to the person image included in the person re-verification instruction (St56). When a person image that matches or is similar to the person image is extracted (St56, similar), the person search server 60 returns a processing result including the target person information (for example, the thumbnail of the target person) to the AI-integration server 10 (St57). The AI-integration server 10 sends the processing result returned from the person search server 60 to the client terminal VW1 (St58). The client terminal VW1 generates a search result screen showing the processing result of the search sent in step St58 and displays the screen on the display device 116.

On the other hand, when the person search server 60 cannot extract any face image that matches or is similar to the person image (St56, not similar), the person search server 60 returns a processing result indicating that there is no corresponding person information to the AI-integration server 10 (St59). The AI-integration server 10 displays the processing result of step St59 on the client terminal VW1.

As described above, in the investigation assist system 1 according to Embodiment 2, the plurality of servers include the behavior detection server 70 that detects a predetermined action caused by at least one person based on the videos captured by the plurality of cameras. Based on the action detection, the behavior detection server 70 sends an alarm notification including camera information (for example, identification information of a camera) of the camera corresponding to the captured video data in which the action is detected to the AI-integration server 10. As a result, when a predetermined action is detected while monitoring the location where each of the plurality of cameras is installed, since the investigation assist system 1 can receive the alarm notification from the behavior detection server 70, it is possible to promptly grasp the location where the action has been taken and to appropriately monitor the captured video data of the camera at that location.

In addition, the plurality of servers include the face authentication server 50 that uses a face database (for example, blacklist data) in which the faces of persons are registered to perform verification. The AI-integration server 10 sends to the terminal an instruction to display a live video corresponding to the camera information included in the alarm notification. The AI-integration server 10 sends a verification request for the face of a person to the face authentication server 50 based on the selection of the person shown in the live video displayed on the terminal based on the display instruction, and sends a verification result from the face authentication server 50 to the terminal. As a result, since the investigation assist system 1 can specify a person from the face image of the person shown in the live video of the camera capturing the scene when the occurrence of an action is detected, it is possible to efficiently detect a person who can be a suspect in an incident at an early stage.

Further, the face authentication server 50 verifies the face of a person by using a face database (for example, blacklist data) based on the verification request for the face of the person, and sends a verification result to the AI-integration server 10. As a result, the investigation assist system 1 can specify the face image and the personal information of the person who has taken the action at an early stage, and can improve the work efficiency of the police officer and the like.

Further, the face authentication server 50 further verifies the face of a person by using the captured video data of each of the plurality of cameras based on the verification request for the face of the person, and sends a verification result to the AI-integration server 10. As a result, the investigation assist system 1 can specify with high accuracy a person shown in the captured video data of the camera capturing the scene when an action is detected.

Further, the predetermined action is at least one of staggering, a fight, possession of a pistol, and shoplifting. As a result, the investigation assist system 1 can appropriately detect an action equivalent to at least one crime among staggering, a fight, possession of a pistol, and shoplifting while monitoring a location where each of a plurality of cameras is installed, and it is possible to assist the early specification of suspects such as incidents by police officers.

Although various embodiments have been described with reference to the drawings, it goes without saying that the present disclosure is not limited to such examples. It is obvious to those skilled in the art that various changes, modifications, substitutions, additions, deletions and equivalents can be conceived within the scope of the claims, and it is understood that of course those also belong to the technical scope of the present disclosure. Further, the respective constituent elements in the various embodiments described above may be arbitrarily combined without departing from the spirit of the invention.

In Embodiment 1 described above, as the search handled by the AI-integration server 10, a person search by the person search server 60 and a vehicle search by the vehicle search server 80 have been described as examples, but the search is not limited thereof. In other words, as shown in FIG. 4 or 5, the search condition is not limited to a person or a vehicle. For example, the search handled by the AI-integration server 10 may be applied to face detection (face search) by the face authentication server 50, a license plate search by the LPR server 90, and further, a person search by the person search server 60 and a vehicle search by the vehicle search server 80 may be used in combination. In this case, a face image (image search) or a license plate (text search or image search) may be used as the search condition. As a search result using a face image, for example, the face image FCE1 shown in FIG. 7 may be displayed. As a search result using a license plate, for example, the license plate detail display information PLT1 shown in FIG. 8 or 9 and the face image FCE2 of the purchaser of the vehicle corresponding to the license plate information may be displayed.

In the above-described Embodiment 1, as an example of the AND search (cross-sectional search) handled by the AI-integration server 10, the AND search of a person search by the person search server 60 and a vehicle search by the vehicle search server 80, and the AND search of a face verification by the face authentication server 50, a person search by the person search server 60, and a vehicle search by the vehicle search server 80 have been described, but examples of the AND search are not limited thereto. For example, the AI-integration server 10 can perform an AND search (cross-sectional search) with the following combinations.

For example, in addition to face verification by the face authentication server 50, at least one of the person search by the person search server 60, the behavior detection by the behavior detection server 70 (for example, verification of face images similar to those of persons who get into a fight or have a pistol), the vehicle search by the vehicle search server 80 (for example, verification of face images of males in their thirties in a white car), the license plate verification by the LPR server 90 (for example, verification of face images of persons who are in a vehicle with a specific number in the upper two digits and are similar to a certain face image), and the like can be combined.

Further, for example, in addition to the person search by the person search server 60, at least one of the behavior detection by the behavior detection server 70 (for example, searching for a person in black clothes carrying vandalism or possessing a pistol), the search by the vehicle search server 80 (for example, searching for a person in red clothes approaching a white car), the license plate verification by the LPR server 90 (for example, searching for a person in black clothes approaching a vehicle with a specific number), and the like can be combined.

Further, for example, in addition to the vehicle search by the vehicle search server 80, at least one of the behavior detection by the behavior detection server 70 (for example, searching for a sedan-type vehicle running in a reverse direction or a taxi vehicle threatened by a pistol from the outside) and the license plate verification by the LPR server 90 (for example, searching for a vehicle running in a reverse direction with a specific number in the upper two digits) can be combined.

Further, for example, in addition to license plate verification by the LPR server 90, at least one of the behavior detection by the behavior detection server 70 (for example, detection of an action of running in a reverse direction with a specific number in the upper two digits, detection of an action of threatening the driver of a taxi vehicle with a specific number in the upper two digits with a pistol from the outside) and the like can be combined.

Embodiment 1 described above illustrates that the object in each of the images captured by the cameras C1 to C20 is a person or a vehicle, but the object is not limited to a person or a vehicle, and may be another object (for example, a moving body). The moving body may be a flying object such as a drone operated by a person such as a suspect who has caused an incident.

The present disclosure is useful as an investigation assist system, an investigation assist method, and a computer program that improve the convenience of an investigation by an investigation agency such as the police by promptly and efficiently assisting the specification of a suspect who has caused an incident or a getaway vehicle used by the suspect for escape.

The present application is based upon Japanese Patent Application (Patent Application No. 2019-160659 filed on Sep. 3, 2019), the content of which is incorporated herein by reference.

What is claimed is:

1. An investigation assist system, comprising:
   a plurality of servers; and
   an integration server communicatively connected to a terminal and the plurality of servers, wherein
   in response to reception of a video captured by at least one a plurality of cameras, each of the plurality of servers is configured to perform a video analysis of an object with respect to an incident, the plurality of servers processing different objects, respectively,
   based on an input of at least one object feature element from the terminal, the integration server, for each object feature element:
      specifies one of the plurality of servers corresponding to the object feature element for searching for the object feature element;
      sends a search request for the object feature element to the one of the plurality of servers corresponding to the object feature element; and
      receives search results of the object feature element from the one of the plurality of servers, and
   the integration server integrates, for the at least one object feature element, the search results received for each object feature element and causes the terminal to display an integrated search result.

2. The investigation assist system according to claim 1, wherein
   each of the plurality of servers performs the video analysis of the object based on an object search algorithm, the plurality of servers using different object search algorithms, respectively; and
   the integration server has a common search algorithm in which the object search algorithms used in the plurality of servers are generalized, and uses the common search algorithm to send the search request for the object feature element to the one of the plurality of servers corresponding to the object feature element.

3. The investigation assist system according to claim 1, wherein
   the integrated search result of the at least one object feature element displayed on the terminal comprises thumbnails of a plurality of persons, respectively.

4. The investigation assist system according to claim 3, wherein
   based on a selection of one of the thumbnails, the integration server causes the terminal to display a viewing screen of a captured video of a person shown in the selected one of the thumbnails and a map display screen on which an installation location of a camera corresponding to the captured video is superimposed.

5. The investigation assist system according to claim 3, wherein
   the plurality of servers includes a face authentication server that uses a face database in which faces of persons are registered for verification; and
   based on a selection of at least one of the thumbnails of the plurality of persons, the integration server sends to the face authentication server a verification request for a face of a person shown in the selected at least one of the thumbnails, and sends a verification result from the face authentication server to the terminal.

6. The investigation assist system according to claim 1, wherein
   the integrated search result of the at least one object feature element displayed on the terminal comprises thumbnails of a plurality of vehicles.

7. The investigation assist system according to claim 6, wherein
   based on a selection of one of the thumbnails, the integration server causes the terminal to display a viewing screen of a captured video of a vehicle shown in the selected one of the thumbnails, and a vehicle screen showing detailed vehicle information including a license plate of the vehicle.

8. The investigation assist system according to claim 6, wherein
   the plurality of servers includes a license authentication server that uses a vehicle owner database in which face images and personal information of vehicle owners are registered in association with license plates for verification; and
   based on a selection of at least one of the thumbnails of the plurality of vehicles, the integration server sends to the license authentication server a verification request for owner information of a vehicle shown in the selected at least one of the thumbnails, and sends a verification result from the license authentication server to the terminal.

9. The investigation assist system according to claim 1, wherein
   the plurality of servers includes a behavior detection server that detects a predetermined action caused by at least one person, based on videos captured by the plurality of cameras; and
   the behavior detection server sends to the integration server an alarm notification including camera information corresponding to a captured video in which the predetermined action is detected, based on detection of the predetermined action.

10. The investigation assist system according to claim 9, wherein
    the plurality of servers includes a face authentication server that uses a face database in which faces of persons are registered for verification; and
    the integration server
       sends a display instruction for a live video corresponding to the camera information included in the alarm notification to the terminal, and
       based on a selection of a person shown in the live video displayed on the terminal based on the display instruction, sends a verification request for a face of the person to the face authentication server, and send a verification result from the face authentication server to the terminal.

11. The investigation assist system according to claim 10, wherein
    the face authentication server verifies the face of the person by using the face database based on the verification request for the face of the person, and sends the verification result to the integration server.

12. The investigation assist system according to claim 11, wherein
the face authentication server further verifies the face of the person by using the captured video of each of the plurality of cameras based on the verification request for the face of the person.

13. The investigation assist system according to claim 9, wherein
the predetermined action comprises at least one of staggering, a fight, possession of a pistol, or shoplifting.

14. The investigation assist system according to claim 1, wherein
based on an input of a plurality of different object feature elements from the terminal, the integration server sends a search request for corresponding objects to respective servers corresponding to the plurality of different object feature elements, receives search results of the corresponding objects from the respective servers, and causes the terminal to display a search result of one of the corresponding objects.

15. The investigation assist system according to claim 1, wherein
the integration server includes a memory, and
the memory stores a common search algorithm in advance, with the common search algorithm being used to generalize the search request for the object feature element.

16. The investigation assist system according to claim 1, wherein
the input includes at least two object feature elements,
the integration server specifies two different ones of the plurality of servers for the two object feature elements,
the integration server sends two search requests to the two different ones of the plurality of servers for performing a cross-sectional search for the two object feature elements, and
the integration server receives the search results for the two object feature elements from the two different ones of the plurality of servers.

17. The investigation assist system according to claim 16, wherein
the integration server determines a rank indicating a matching degree of the search results received from the two different ones of the plurality of servers, and
the integration server causes the terminal to display the integrated search result in accordance with the rank.

18. The investigation assist system according to claim 17, wherein
the search results received from the two different ones of the plurality of servers include thumbnail images matching the two object feature elements, and
the integration server causes the terminal to display the thumbnail images in accordance with the rank.

19. The investigation assist system according to claim 1, wherein the integration server uses a common interface for communication with the plurality of servers.

20. An investigation assist method performed by an investigation assist system, the investigation assist system including a plurality of servers and an integration server communicatively connected to a terminal and the plurality of servers, the investigating assist method comprising:
receiving a video captured by at least one a plurality of cameras, each of a plurality of servers configured to perform a video analysis of an object with respect to an incident, the plurality of servers processing different objects, respectively;
based on an input of at least one object feature element from the terminal, for each object feature element:
specifying one of the plurality of servers corresponding to the object feature element for searching for the object feature element;
sending a search request for the object feature element to the one of the plurality of servers corresponding to the object feature element; and
receiving search results of the object feature element from the one of the plurality of servers;
integrating, for the at least one object feature element, the search results received for each object feature element; and
causing the terminal to display an integrated search result.

* * * * *